(12) United States Patent
Hisamatsu et al.

(10) Patent No.: US 7,477,302 B2
(45) Date of Patent: Jan. 13, 2009

(54) SOLID-STATE IMAGE PICKUP APPARATUS AND IMAGE PICKUP METHOD

(75) Inventors: Yasuaki Hisamatsu, Kanagawa (JP); Tsutomu Haruta, Kanagawa (JP); Ken Matsumoto, Kanagawa (JP)

(73) Assignee: Sony Corporation, Toyko (JP)

( * ) Notice: Subject to any disclaimer, the term of this patent is extended or adjusted under 35 U.S.C. 154(b) by 772 days.

(21) Appl. No.: 10/998,528

(22) Filed: Nov. 29, 2004

(65) Prior Publication Data

US 2005/0140795 A1    Jun. 30, 2005

(30) Foreign Application Priority Data

Dec. 5, 2003   (JP)   ............... P2003-407515

(51) Int. Cl.
    *H04N 9/64*   (2006.01)
(52) U.S. Cl. ...................................... 348/243
(58) Field of Classification Search .................. 348/241, 348/243
    See application file for complete search history.

(56) References Cited

U.S. PATENT DOCUMENTS 5,943,094 A * 8/1999 Sakai et al. ................. 348/243

FOREIGN PATENT DOCUMENTS

| JP | 08-065546 | 3/1996 |
|---|---|---|
| JP | 09-326962 | 12/1997 |
| JP | 11-041526 | 2/1999 |
| JP | 10-211143 | 2/2000 |
| JP | 2000-261730 | 9/2000 |
| JP | 2002-300477 | 10/2002 |

OTHER PUBLICATIONS

Japanese Office Action issued on Mar. 4, 2008.

* cited by examiner

*Primary Examiner*—David L Ometz
*Assistant Examiner*—Dillon Durnford-Geszvain
(74) *Attorney, Agent, or Firm*—Sonnenschein Nath & Rosenthaal LLP

(57) ABSTRACT

A solid-state image pickup apparatus and an image pickup method are disclosed which can detect and correct fixed pattern noise efficiently and accurately. Pickup image signals produced by reading out signals in parallel from a pixel sensor section are subject to an analog gain process, an A/D conversion process and a digital gain process. Within a period within which the pickup image signals which are based on a fixed value are inputted within a one-frame period, a reference signal average is produced from the signals. Sum values of difference values of the signals from the reference signal average are stored. Within a period within which the pickup image signals from valid pixels are inputted within the one-frame period, fixed pattern noise is removed from the pickup image signals using division averages obtained by dividing the stored sum values.

16 Claims, 13 Drawing Sheets

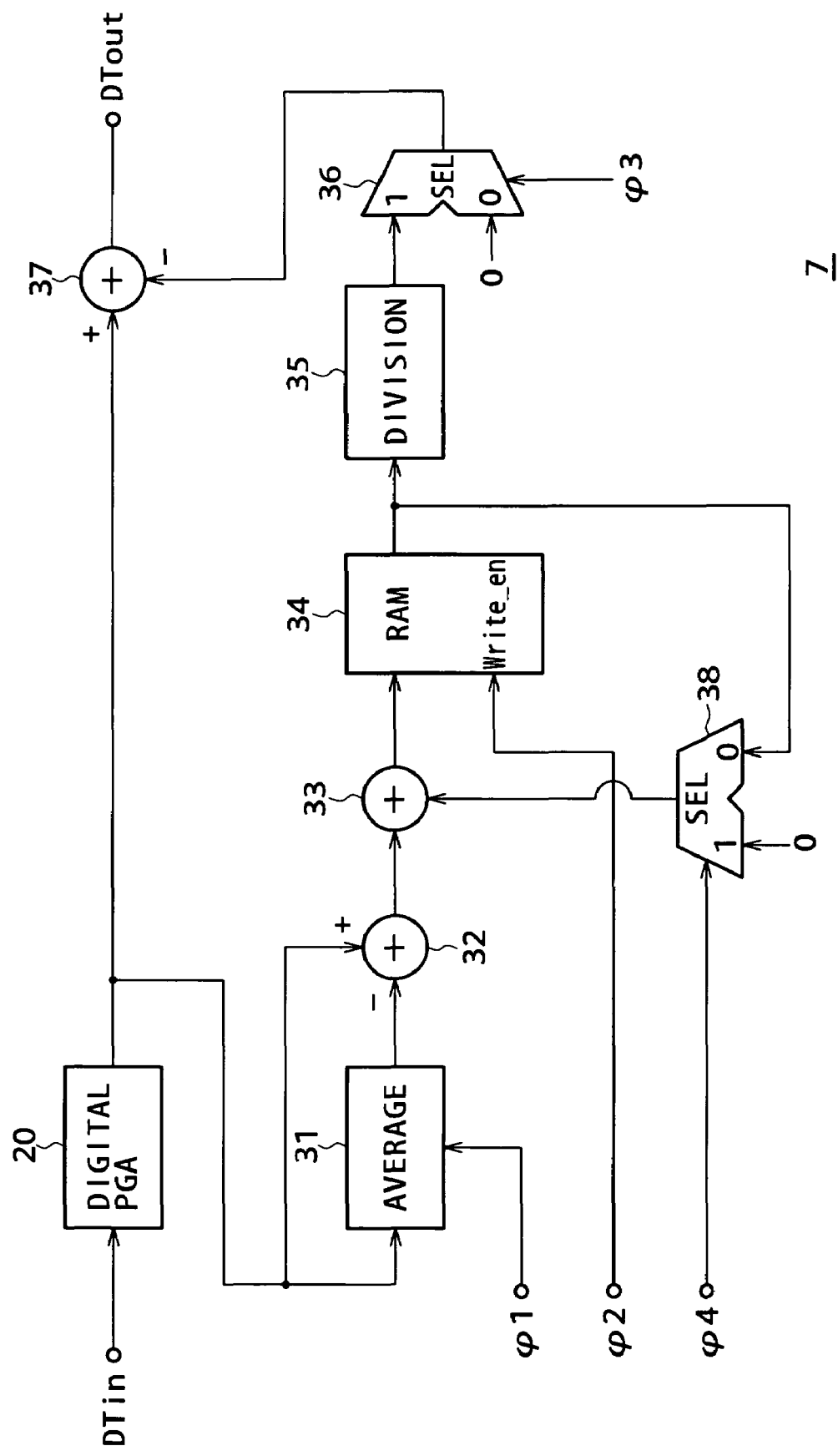
F I G. 3

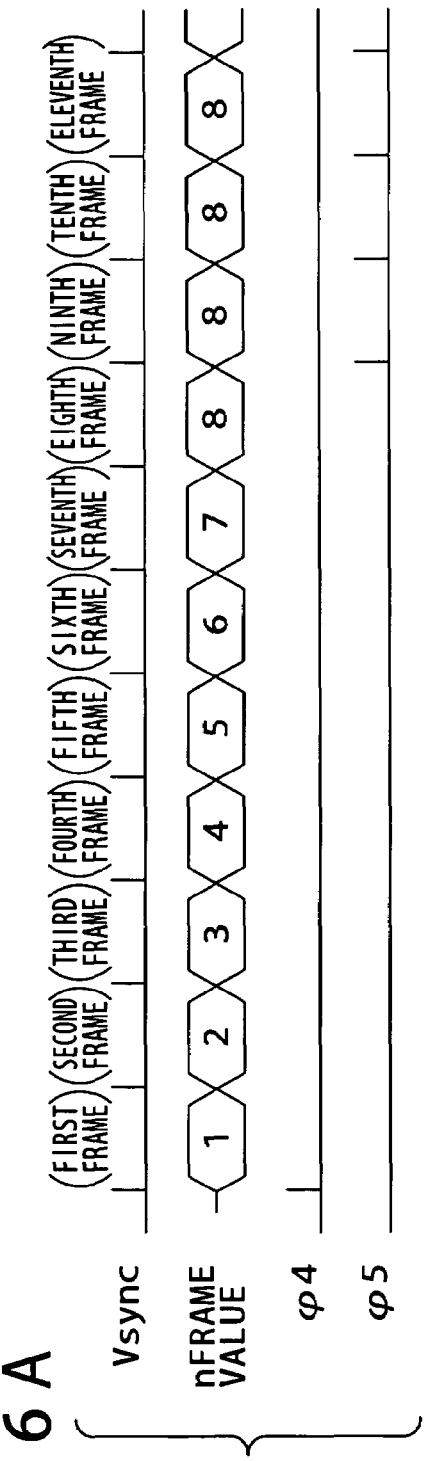
F I G. 6A
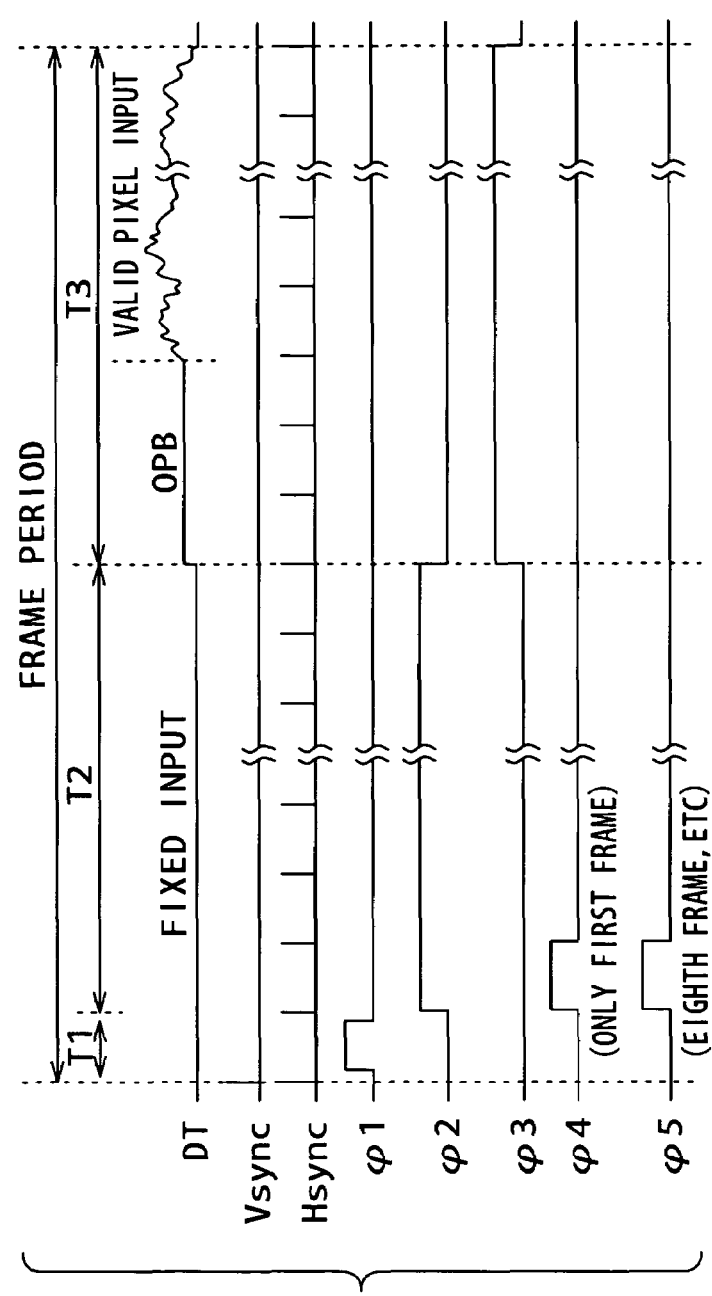
F I G. 6B

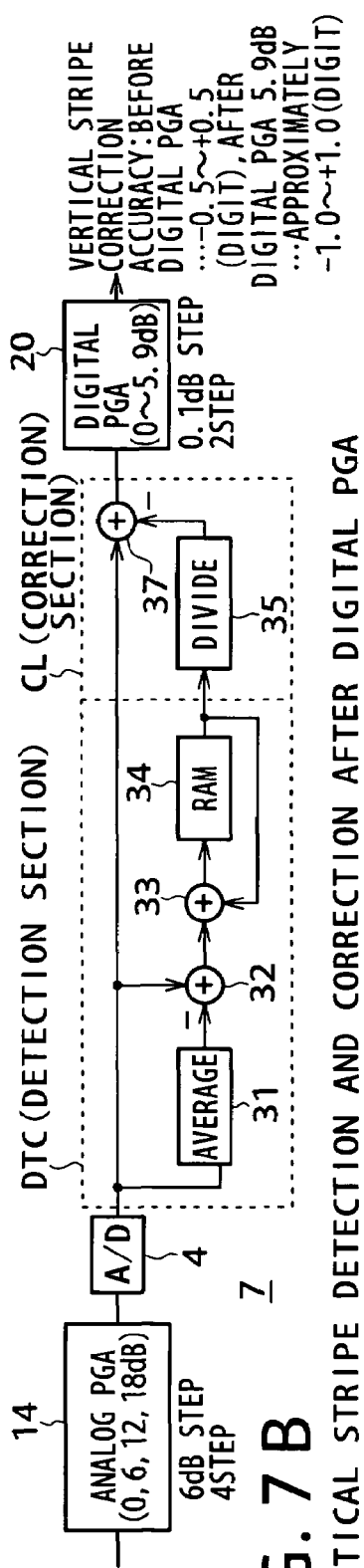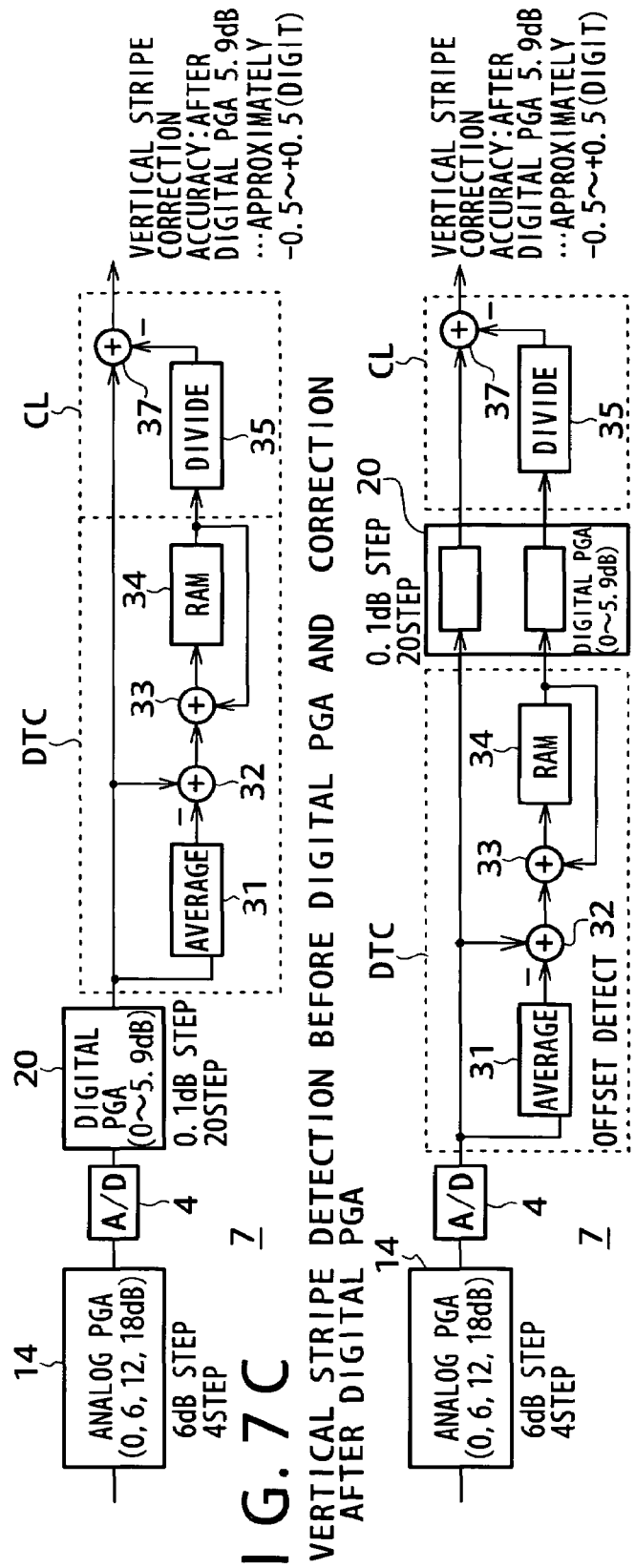

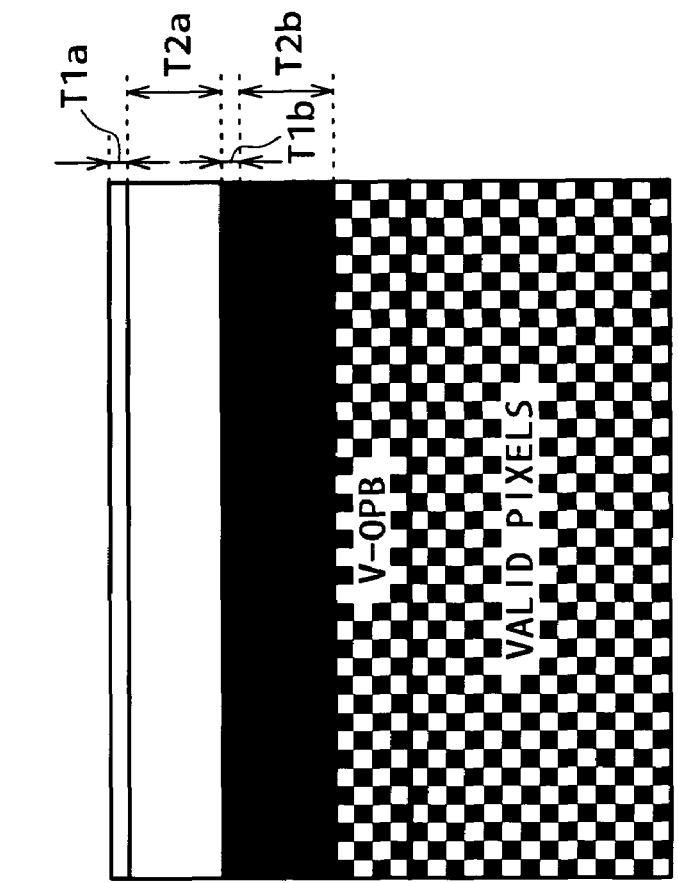
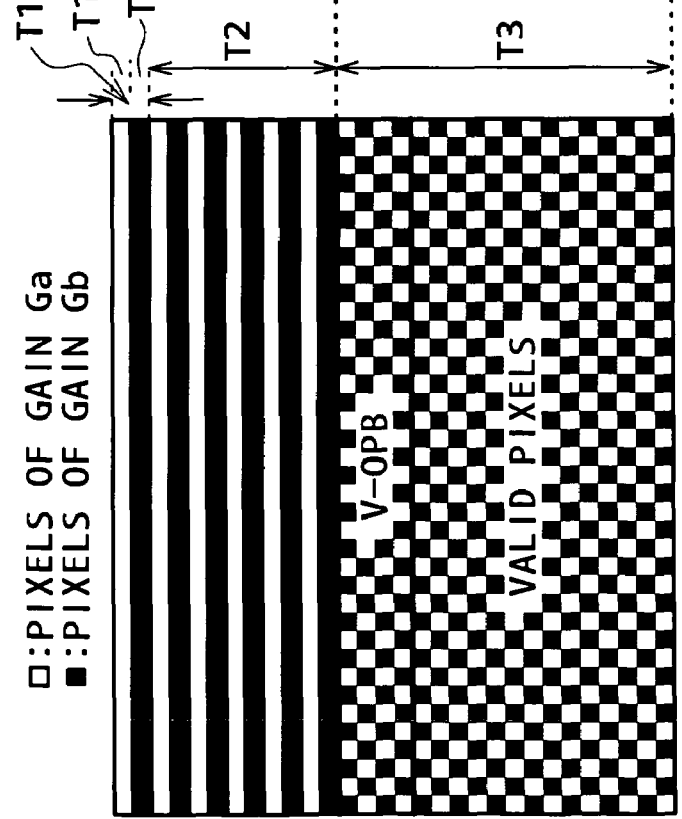

SOLID-STATE IMAGE PICKUP APPARATUS AND IMAGE PICKUP METHOD

RELATED APPLICATION DATA

The present application claims priority to Japanese Application(s) No(s). P2003-407515 filed Dec. 5, 2003, which application(s) is/are incorporated herein by reference to the extent permitted by law.

BACKGROUND OF THE INVENTION

This invention relates to a solid-state image pickup apparatus and an image pickup method for a solid-state image pickup apparatus, and more particularly to correction of fixed pattern noise for a solid-state image pickup apparatus and an image pickup method for a solid-state image pickup apparatus.

An image pickup apparatus which uses a solid-state image pickup element such as a CMOS image sensor is known already and is still developed and investigated in order to achieve further increase in number of pixels, speed in image pickup, a wide dynamic range and further reduction of noise.

However, if the processing frequency is raised simply in order to process a greater number of pixels at a higher speed, then this gives rises to a problem of degradation of an analog circuit system in terms of noise, power consumption and accuracy. Therefore, such a technique is used as to read out, from an image pickup element array in which solid-state image pickup elements are arranged in rows and columns, image signals at a time from the columns or transfer such image signals in parallel along a plurality of lines in a horizontal direction so that the signal reading out process is performed at a reduced speed.

However, a dispersion in a production process or the like gives rise to a problem that it causes a dispersion in inputting and outputting characteristics in such parallel reading out as described above, resulting in generation of fixed pattern noise including a striped defect on an output image. Japanese Patent Laid-Open No. 2000-261730 (hereinafter referred to as Patent Document 1) discloses an apparatus wherein such fixed pattern noise is stored as a digital value and the stored value is used to correct a pickup image signal to obtain an image free from vertical stripe noise.

However, in order to accurately recognize fixed pattern noise in the form of a vertical stripe, a large invalid area is required in addition to a valid image area. This arises from the fact that to add and average a number of pickup image signals as great as possible within a period within which a fixed pattern noise component is obtained is advantageous in improvement of the accuracy of the value of fixed pattern noise. This, however, acts negatively in high speed image pickup.

Further, from a characteristic of digital arithmetic operation, a limit to correction by a gradation upon A/D conversion is provided by a quantization error, an arithmetic operation rounding error and so forth. Particularly in a system which has an A/D converter of a low gradation, this correction limit matters and sometimes makes the noise cancellation insufficient.

Further, although it is preferable to use a number of pickup image signals as great as possible for addition and averaging in order to improve the accuracy of a value to be stored as fixed pattern noise, this increases the value of the added average and increases the required memory capacity, which is not efficient.

Furthermore, sometimes an image of a wide dynamic range is used or a plurality of gain patterns are included in one screen in order to improve the S/N ratio. In this instance, the image or the screen sometimes includes a plurality of different fixed noise patterns. Also a correction process applicable to such a plurality of fixed pattern noise patterns as just described is demanded.

SUMMARY OF THE INVENTION

It is an object of the present invention to provide a solid-state image pickup apparatus and an image pickup method by which fixed pattern noise can be detected and corrected efficiently with a high degree of accuracy.

According to a first aspect of the present invention, there is provided a solid-state image pickup apparatus, including a pixel sensor section formed from an array of solid-state image pickup elements for generating signals corresponding to incoming light, an image signal reading out section for performing parallel reading out of the signals obtained by the pixel sensor section to produce pickup image signals and performing an analog gain process for the pickup image signals, an A/D conversion section for A/D converting the pickup image signals outputted from the image signal reading out section, and a digital processing section for performing a digital gain process for the pickup image signals outputted from the A/D conversion section and performing a correction process of removing fixed pattern noise from the pickup image signals. The digital processing section performs the correction process such that, within a period within which the pickup image signals which are based on a fixed value are inputted within a one-frame period of the pickup image signals, a reference signal average is calculated from the pickup image signals based on the fixed value and sum values of difference values of the pickup image signals based on the fixed value from the reference signal average are stored, and then within a period within which the pickup image signals from valid pixels of the pixel sensor section are inputted within the one-frame period, division averages obtained by dividing the stored sum values are used for the correction.

According to another aspect of the present invention, there is provided an image pickup method, including an image signal reading out step of performing parallel reading out of signals obtained by a pixel sensor section, which is formed from an array of solid-state image pickup elements for generating signals corresponding to incoming light, to produce pickup image signals and performing an analog gain process for the pickup image signals, an A/D conversion step of A/D converting the pickup image signals outputted at the image signal reading out step, a digital gain processing step of performing a digital gain process for the pickup image signals obtained at the A/D conversion section, a reference signal average calculation step of calculating, within a period within which the pickup image signals which are based on a fixed value are inputted within a one-frame period of the pickup image signals, a reference signal average from the pickup image signals based on the fixed value, a sum value storage step of storing sum values of difference values of the pickup image signals based on the fixed value from the reference signal average, and a correction step of performing, within a period within which the pickup image signals from valid pixels of the pixel sensor section are inputted within the one-frame period, a correction process of removing fixed pattern noise from the pickup image signals using division averages obtained by dividing the stored sum values.

According to another aspect of the present invention, there is provided a solid-state image pickup apparatus, including an image pickup area having a plurality of pixels disposed thereon, and a circuit area for processing image signals from the image pickup area. The circuit area includes a subtraction section for subtracting a predetermined amount of signal components from the image signals and a pattern noise detection section for detecting pattern noise from signals obtained by the subtraction by the subtraction section.

In the solid-state image pickup apparatus and the image pickup method, the process of calculating a reference signal average and storing sum values of difference values of pickup image signals from the reference signal average is for detecting a fixed pattern noise value which makes vertical stripe noise. At this time, only a dispersion component of signals is required as a value for fixed pattern noise, but a DC component is not required. Therefore, a DC component is detected as the reference signal average, and difference values of the pickup image signals from the DC component are cumulatively added. Then, averages obtained by dividing the sum values obtained by the cumulative addition are subtracted as fixed pattern noise values from the pickup image signals to perform correction for the vertical stripe noise.

Further, where the sum values are not cleared after every one frame but are successively added over a plurality of frames, even if the number of times of addition within a one-frame period is decreased, a number of times of addition by which sum values as fixed pattern noise components of a sufficiently high degree of accuracy are obtained can be achieved over a period of a plurality of frames.

In this instance, where an upper limit to the number of frames as the period of a plurality of frames is set and, within every frame period after the upper limit frame number is exceeded, values corresponding to sum values for one frame are subtracted from the sum values stored till then and the difference values in the following frame are added to the values obtained by the subtraction, the sum value data are updated while the amount of the sum values are maintained fixed.

With the solid-state image pickup apparatus and the image pickup method, in the correction process, the process of calculating a reference signal average and storing sum values of difference values of pickup image signals from the reference signal average (DC component) is performed. Then, averages obtained by dividing the sum values are subtracted as fixed pattern noise values from the pickup image signals to perform correction for vertical stripe noise. In other words, in a noise removal method which uses an arithmetic average method, difference values from a DC component are cumulatively added and the cumulative sum values are stored. This is effective to reduce the required capacity of a memory for storing the sum values and hence achieve improvement in efficiency.

Where such cumulative addition is successively performed over a plurality of frames, a sufficiently high degree of accuracy in detection can be achieved while an invalid pixel reading out period within one frame for recognizing fixed pattern noise arising from a circuit of the reading out system for the pickup image signals is suppressed to increase efficiency.

Further, where an upper limit is provided to the number of frames over which such successive addition is performed and, within every frame period after the upper limit frame number is exceeded, the sum values are successively updated while the amount of the sum values is kept fixed, the memory capacity can be maintained at an appropriate level and the accuracy of the sum values can be maintained. Further, also it is possible to cope with such a situation that the vertical stripe noise amount is fluctuated by such a factor as a power supply voltage or a temperature.

Where, in the correction process, a digital gain process similar to the digital gain process for the pickup image signals is preformed for the sum values and then the calculation of the division averages is performed for the resulting sum values, the accuracy of the division can be improved.

A gain variation step size of the digital gain process of the digital processing section may be set smaller than a gain variation step size of the analog gain process of the image signal reading out section. If the analog gain changes, then it is necessary to re-perform detection of a fixed pattern noise component. However, where the gain variation step size of the analog gain process is set greater, the opportunity of the change of the analog gain is reduced, and consequently, the opportunity wherein it becomes necessary to re-perform detection of a fixed pattern noise component can be reduced. This increases improvement in efficiency of the process.

Also where random noise is added to the division averages, fixed noise which may remain even after the correction can be moderated. Particularly with a system which uses an A/D converter which does not have a very high resolution, vertical stripe noise can be made less conspicuous. In other words, the correction limit accuracy can be moderated visually.

Further, the rate at which the random noise is to be added may be controlled in response to values of the remainder upon arithmetic operation of the division averages. More particularly, whether or not the random noise should be added may be determined in response to results of comparison in magnitude between the values of the remainder and pseudo uniform random numbers. Consequently, noise addition is performed in response to the amount to be cut off upon the division, and this is suitable for moderation of noise. Further, the correction limit accuracy is raised artificially.

Further, in the correction process, for each of a plurality of gain setting values set for the pixels which form one screen, the calculation of the reference signal average, the storage of the sum values and the correction wherein the division averages of the sum values are used may be performed. Thus, detection and correction of fixed pattern noise can be performed appropriately with a solid-state image pickup system wherein one screen involves a plurality of gain setting values different from each other.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a block diagram of a digital PGA/vertical stripe cancellation circuit of a solid-image pickup apparatus according to a first embodiment of the present invention;

FIGS. 6A and 6B are waveform diagrams illustrating correction operation of the digital PGA/vertical stripe cancellation circuit of FIG. 5;

FIGS. 7A, 7B and 7C are block diagrams illustrating possible locations of a digital PGA in a solid-image pickup apparatus;

FIGS. 12A and 12B are diagrammatic views illustrating a plurality of gain set values by the digital PGA/vertical stripe cancellation circuit of FIG. 10.

DESCRIPTION OF THE PREFERRED EMBODIMENTS

In the following, several embodiments of the present invention are described. First, a general configuration of a solid-state image pickup apparatus to which the present invention is applied is described, and then several configurations particularly for correction of vertical stripe noise are described in connection with the first to fifth embodiments of the present invention.

General Configuration

First, a configuration of a solid-state image pickup apparatus to which the present invention is described and then vertical stripe noise (fixed pattern noise) is described with reference to FIGS. 1, 2A and 2B.

Figure 1:
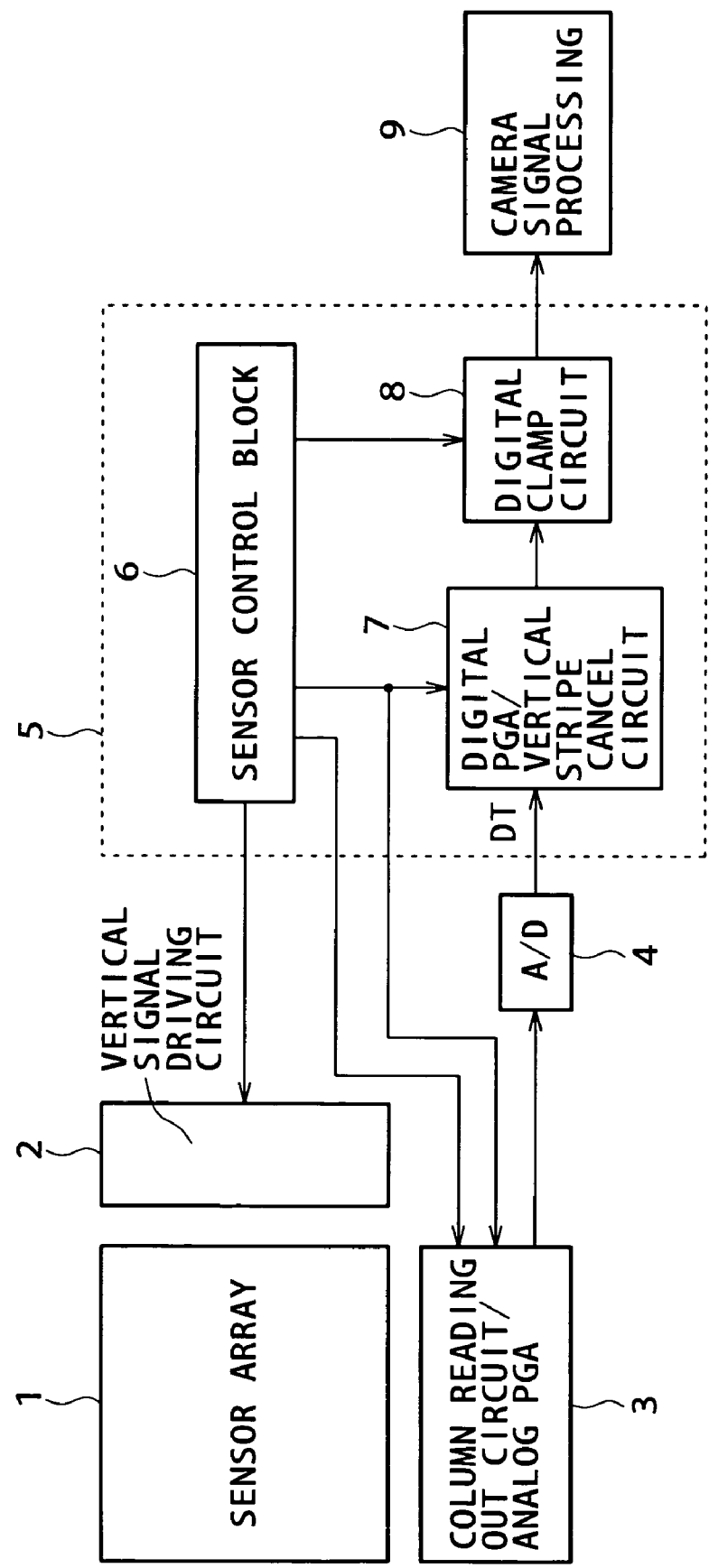
FIG. 1 is a block diagram of part of a solid-image pickup apparatus to which the present invention is applied.

FIG. 1 shows a configuration of part of a solid-state image pickup apparatus, and FIG. 2A shows details of a sensor array 1 and a column reading out circuit/analog PGA 3 shown in FIG. 1.

To the sensor array 1 shown in FIG. 1, light from an image pickup subject is introduced by a lens system not shown. The sensor array 1 may be, for example, a CMOS sensor array and includes a large number of image pickup pixels G as solid-state image pickup elements (CMOS sensors) disposed, for example, in rows and columns as seen in FIG. 2A. Each of the image pickup pixels G includes a photodiode and transistors (transfer transistor, reset transistor and amplification transistor) as seen in FIG. 2A. Although detailed description is omitted herein, pulses are applied from a vertical signal driving circuit 2 shown in FIG. 1 at individually predetermined timings to the gates of the transistors of the image pickup pixels G to turn on/off the transistors. As a result, operations of resetting charge of the photodiodes and transferring charge accumulated in the photodiodes to vertical signal lines VL (VL1, VL2, . . . ) are performed.

The solid-state image pickup apparatus uses a pixel reading out method of a column parallel type. Therefore, signal charge from the image pickup pixels G arranged in the row direction in the sensor array 1 is read out at a time and supplied to the vertical signal lines VL (VL1, VL2, . . . ).

More particularly, the vertical signal driving circuit 2 causes the pixels in a row selected thereby to supply signal charge of a reset level to the vertical signal lines VL and then causes pixel signals corresponding to the charge accumulated in the photodiodes PD to the vertical signal lines VL. The vertical signal driving circuit 2 executes such a reading out operation as just described successively with regard to the image pickup pixels G in the successive rows.

Reading out of pixel signals from the image pickup pixels G in a certain selected row is performed within a horizontal blanking period within one horizontal period. In other words, within a horizontal blanking period, pixel signals from the image pickup pixels G in a row selected by the vertical signal driving circuit 2 are outputted in parallel to the vertical signal lines VL1, VL2, . . . .

The signal charge of the pixels transferred from the sensor array 1 of FIG. 1 to the vertical signal lines VL is read out as pickup image signals which form an image frame and is subject to an analog gain process by a column reading out circuit/analog PGA (Programmable Gain Amplifier) 3.

In the column reading out circuit/analog PGA 3, a CDS circuit (Correlated Double Sampling) 11 shown in FIG. 2A first samples charge of the vertical signal lines VL.

The CDS circuit 11 includes a sampling circuit system formed from capacitor elements C1 and C2 and switch elements SW2 and SW3 for each of the vertical signal lines VL (for each column).

Further, in the CDS circuit 11 shown in FIG. 2A, two horizontal signal lines HL1 and HL2 are disposed, and the switch elements SW3 of the sampling circuit systems for the columns of the CDS circuit 11 are connected alternately to the horizontal signal lines HL1 and HL2 for the individual columns. It is to be noted that the reason why the two horizontal signal lines HL1 and HL2 are used is that it is intended to lower the horizontal transfer frequency when compared with that where one horizontal signal line is involved. Naturally, the CDS circuit 11 may be configured such that it includes a single horizontal signal line or three of more horizontal signal lines to achieve parallel horizontal transfer.

Reference signal lines Href1 and Href2 to which a reference voltage Vref is supplied are disposed corresponding to the horizontal signal lines HL1 and HL2, respectively. The switch elements SW2 of the sampling circuit systems for the columns of the CDS circuit 11 are connected alternately to the reference signal lines Href1 and Href2 for the individual columns.

Signals appearing on the horizontal signal line HL1 and the reference signal line Href1 are inputted to a differential amplifier A1. Meanwhile, signals appearing on the horizontal signal line HL2 and the reference signal line Href2 are inputted to another differential amplifier A2. To each of the differential amplifiers A1 and A2, a feedback capacitor C3 and a switch element SW1 for short-circuiting an input and an output of the differential amplifier A1 or A2 are connected.

Outputs of the differential amplifiers A1 and A2 are successively selected by a multiplexer 12 and supplied as a pickup image signal in the form of a serial signal to an analog PGA 14.

The switch elements SW2 and SW3 for each column of the CDS circuit 11 and the switch element SW1 connected to the differential amplifier A1 or A2 are controlled between on/off at predetermined timings by a horizontal scanning circuit 13. Thus, signals read out column-parallelly from a selected row in the sensor array 1 are successively supplied to the horizontal signal lines HL1 and HL2 and the differential amplifiers A1 and A2, whereby the signal charge is read out. As the signal charge is successively selected by the multiplexer 12, a serial image signal for one line is outputted.

For example, when a signal is to be read out from the image pickup pixels G connected to the vertical signal line VL1, the sampling circuit system for the first column of the CDS circuit 11 and the differential amplifier A1 operate in the following manner.

In particular, the switch elements SW1 and SW2 are switched on first. In this instance, since the input and the output of the differential amplifier A1 are short-circuited, the potentials at the opposite terminals of the capacitor element C2 become equal to each other. This is a state wherein no charge is accumulated in the capacitor element C2.

Then, when a reset level is transferred from the image pickup element G in the selected row to the vertical signal line VL1, the switch element SW2 is switched off. Consequently, signal charge of the reset level is accumulated into the capacitor element C2.

Then, signal charge is supplied from the image pickup element G to the vertical signal line VL1. The signal charge is accumulated into the capacitor element C2, whereupon a signal level as a difference with respect to the reset level is settled.

Then, the switch element SW3 is switched on. At this time, the switch element SW1 is in an off state. Consequently, the charge accumulated in the capacitor element C2 moves to the feedback capacitor C3, whereupon the output level of the differential amplifier A1 varies. The variation of the output level is outputted as a pickup image signal component read out from the certain image pickup element G.

Signals from the image pickup pixels G in the columns in the selected row are read out alternately by the differential amplifiers A1 and A2 by the operation described above and are successively selected by the multiplexer 12 to form a serial pickup image signal for one horizontal line. Within one vertical period, that is, within one frame period, the operation described above is successively performed for the rows of the sensor array 1 and pickup image signals for one frame are outputted from the multiplexer 12.

The pickup image signals read out in this manner are amplified by the analog PGA 14 and then converted into digital data by an A/D converter 4 of FIG. 1. Pickup image signals DT of the digital data are successively supplied to a digital processing circuit 5.

It is to be noted that, while FIG. 2A shows an amplification circuit for a pickup image signal in the form of an analog signal as the analog PGA 14, it is otherwise possible, for example, to form the feedback capacitor C3 of each of the differential amplifiers A1 and A2 as a variable capacitor so that the differential amplifiers A1 and A2 may each function as an analog PGA.

The digital processing circuit 5 includes a sensor control block 6, a digital PGA/vertical stripe cancel circuit 7 and a digital clamp circuit 8.

The sensor control block 6 controls operation timings of the vertical signal driving circuit 2 and the column reading out circuit/analog PGA 3 based on vertical/horizontal synchronizing timings. The sensor control block 6 further controls operation timings of the digital PGA/vertical stripe cancel circuit 7 and the digital clamp circuit 8.

The digital PGA/vertical stripe cancel circuit 7 performs a digital gain process for pickup image signals DT and performs cancellation (correction operation) of vertical stripe noise as fixed pattern noise. Different forms of the configuration of the digital PGA/vertical stripe cancel circuit 7 are hereinafter described.

The pickup image signals DT processed by the digital PGA/vertical stripe cancel circuit 7 are successively clamped by the digital clamp circuit 8 and then supplied to a camera signal processing section 9.

The camera signal processing section 9 performs a pickup image process required in the camera system for the pickup image signals DT. For example, image processes such as a white balance process and so forth and encoding processes such as a formatting process and a compression process are performed. After such required processes are performed, image display of the pickup image signals DT is performed by a display section not shown, or the pickup image signals DT are recorded on a recording medium by a recording section not shown or else transmitted and outputted from a transmission section not shown.

While the general configuration of the solid-state image pickup apparatus shown in FIGS. 1 and 2A is such as described above, in the solid-state image pickup apparatus which employs such a column-parallel reading out system, fixed pattern noise in the form of a vertical stripe is generated from a dispersion of output signals arising from the parallel reading out. In the solid-state image pickup apparatus, vertical stripe noise is corrected digitally by the digital PGA/vertical stripe cancel circuit 7, and a removing method which uses an arithmetic average method is adopted for the correction.

In the digital. PGA/vertical stripe cancel circuit 7 which may assume various forms hereinafter described, an efficient process with a high degree of accuracy is achieved through improvement in an adding method and so forth.

Since the solid-state image pickup apparatus performs pattern noise correction, appearance of fixed pattern noise and a principle of correction of the fixed pattern noise are described simply.

In the field of optical sensors, a demand for increase in number of pixels and in speed of image pickup has been increasing in recent years, and a higher speed process is required. Therefore, speedup in operation of a circuit for processing analog signals outputted from pixels is regarded as a subject to be solved.

Thus, various parallel reading out processing techniques such as to read out signals from the image pickup pixels G at a time for the individual columns as described hereinabove with reference to FIG. 2A or to use, for later horizontal signal transfer, not a single line but a plurality of signal lines and use a plurality of output stages such as the differential amplifiers A1 and A2 described above are used to cope with increase of the pixel number and the image pickup speed.

However, even if such parallel processing circuits are designed on the same layout design, they come to have a dispersion in characteristic caused by a dispersion in production steps and so forth. The dispersion in characteristic gives rise to appearance of fixed pattern noise like a stripe on an output image.

FIG. 2B illustrates waveforms of an input signal to and output signals from a parallel processing circuit. Although the input signal is common, the output signals of the parallel processing circuit exhibits signal levels which are dispersed as seen in FIG. 2B by factors originating from the parallel process such as a dispersion in characteristic of switches, a factor depending upon the layout, a difference in coupling amount of driving pulses, a dispersion in CDS characteristic and a dispersion in current source load characteristic. Such a dispersion of the signal level results in appearance of noise in the form of a vertical stripe on the image.

However, fixed pattern noise can be corrected if the noise pattern thereof can be stored once. Therefore, the digital PGA/vertical stripe cancel circuit 7 at the following stage is configured so as to store a noise pattern using a line memory and correct the noise by a digital signal process based on the stored noise pattern.

Since pixel signals are read out in parallel for individual columns as described above, output signals thereof are dispersed by a factor of a dispersion in characteristic of column reading out circuits. Factors of the dispersion in input/output characteristic for the individual columns can be roughly divided principally into offset dispersion, gain dispersion and nonlinear dispersion. Since the offset dispersion most attracts attention on an output image and is easy to digitally correct, it is first demanded to suppress the offset dispersion.

A method of recognizing the offset dispersion as a digital value may be such that a period within which input signals of a fixed and equal level are applied to all parallel circuits once is provided separately from another period within which valid pixels are processed and the dispersed outputs of the parallel circuits are stored. Thus, offset vertical stripes can be corrected if the stored dispersed outputs of the parallel circuits are subtracted from pickup image signals of the valid pixels.

However, since each output signal usually includes random noise unique to an analog circuit such as thermal noise and 1/f noise, also a filtering process for suppressing the random noise is required.

In the solid-state image pickup apparatus of the invention, an arithmetic average method which is most popular for random noise removal and is most easy in processing is used. Incidentally, since the noise suppression capacity of an arithmetic average method for random noise which exhibits a normal distribution increases inversely in proportion to the ½th power of the number of times of addition, some suitable number of times of addition is required.

First Embodiment

FIG. 3 shows a configuration of the digital PGA/vertical stripe cancel circuit 7 of a solid-state image pickup apparatus according to a first embodiment of the present invention. The digital PGA/vertical stripe cancel circuit 7 shown in FIG. 3 is formed as a circuit block which detects and removes fixed pattern noise (vertical stripe noise) arising from a dispersion in parallel processes such as column parallel reading out and parallel horizontal transfer described hereinabove with reference to FIG. 2B.

Figure 4:
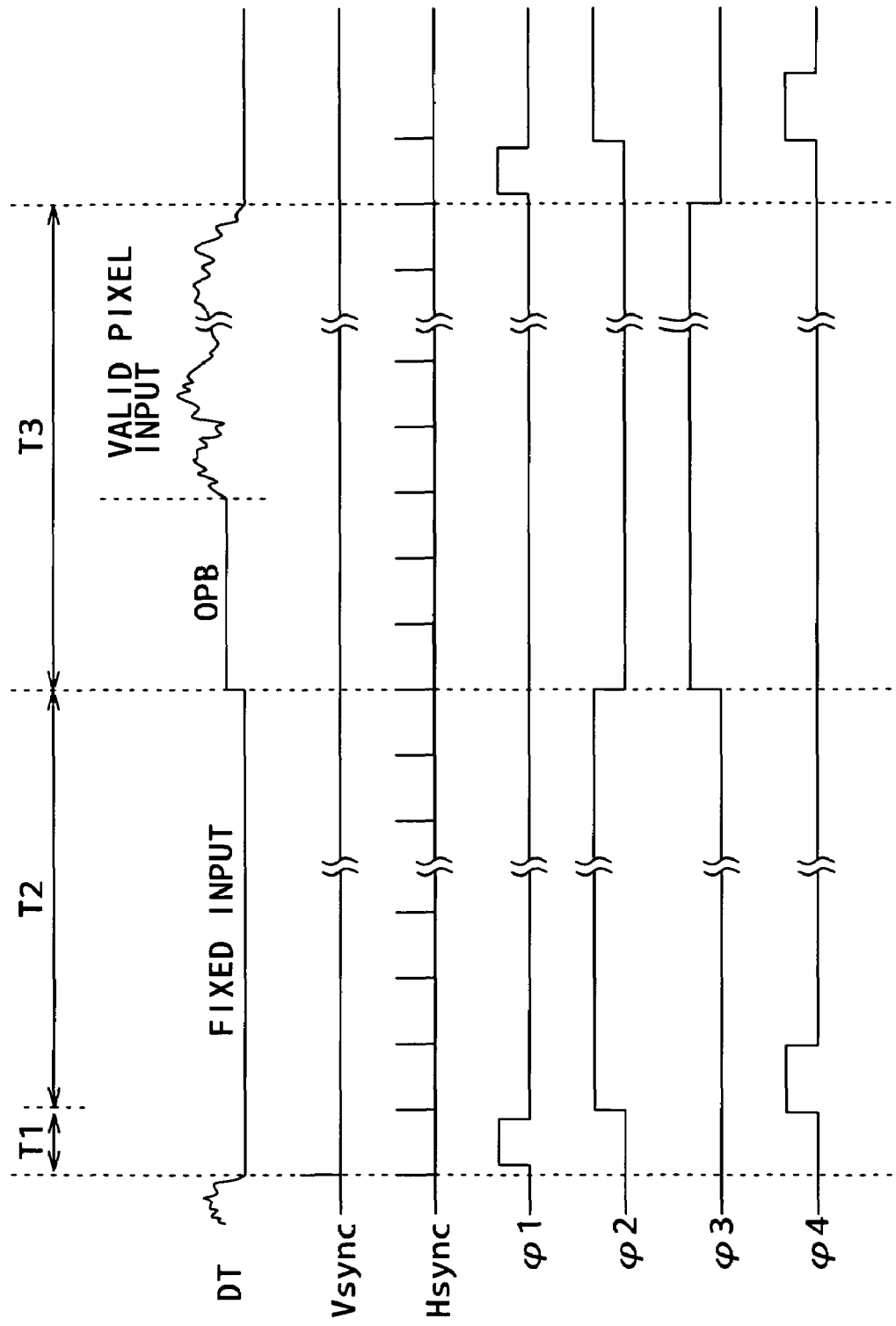
FIG. 4 is a waveform diagram illustrating correction operation of the digital PGA/vertical stripe cancellation circuit of FIG. 3.

FIG. 4 illustrates a timing chart of the digital PGA/vertical stripe cancel circuit 7 shown in FIG. 3 within one frame.

Referring to FIG. 3, a pickup image signal DTin inputted to the digital PGA/vertical stripe cancel circuit 7 is the pickup image signals DT successively supplied from the A/D converter 4 described hereinabove with reference to FIG. 1 to the digital PGA/vertical stripe cancel circuit 7. Meanwhile, a pickup image signal DTout outputted from the digital PGA/vertical stripe cancel circuit 7 is pickup image signals DT whose vertical stripe noise has been corrected by the digital PGA/vertical stripe cancel circuit 7.

The digital PGA/vertical stripe cancel circuit 7 includes a digital PGA 20 for amplifying the pickup image signal DTin by a digital arithmetic operation process, and a circuit system for canceling a vertical stripe. The circuit system for vertical stripe cancellation includes an average arithmetic operation circuit 31, a subtractor 32, an adder 33, a RAM (line memory) 34, a divider 35, selectors 36 and 38, and another subtractor 37. Control signals $\phi 1$ to $\phi 4$ are supplied, for example, from the sensor control block 6 described hereinabove with reference to FIG. 1.

The pickup image signals DT amplified by the digital PGA 20 are successively supplied to the average arithmetic operation circuit 31, subtractor 32 and another subtractor 37.

The average arithmetic operation circuit 31 calculates an average of the pickup image signals DT inputted thereto within a period indicated by the control signal $\phi 1$. The period indicated by the control signal $\phi 1$ is within a period within which pickup image signals based on a fixed value (reference signal) are inputted within a one-frame period. The period within which the fixed value is read out may be, for example, a period within which signal charge of a fixed level is read out from a dummy pixel prepared in advance from which the signal charge of the fixed level is provided to a vertical signal line VL or may otherwise be a period within which a particular reference signal is generated in the parallel processing system described hereinabove.

In other words, the average calculated by the average arithmetic operation circuit 31 is an average of a DC component. The average is hereinafter referred to as reference signal average.

The subtractor 32 successively outputs differences between the pickup image signals DT from the digital PGA 20 and the reference signal average calculated by the average arithmetic operation circuit 31.

The adder 33, RAM 34 and selector 38 cumulatively add the difference values obtained within a period within which writing into the RAM 34 is performed in accordance with the control signal $\phi 2$ as a write enable signal and successively stores the sum values into the RAM 34 serving as a line memory.

In particular, within the period within which the cumulative addition is performed successively, the selector 38 is selectively set to the 0 side in accordance with the control signal $\phi 4$. Consequently, each difference value from the subtractor 32 is added to the corresponding stored value of the RAM 34 by the adder 33, and the resulting sum value is stored into the RAM 34. In other words, the sum value stored in the RAM 34 is fed back to and added by the adder 33 to update the sum value of the RAM 34.

It is to be noted that, in order to reset the stored values (sum values) of the RAM 34 and newly perform addition, the selector 38 is selectively set to the 1 side in accordance with the control signal $\phi 4$ within the first one-line period within which the addition is to be started. In this instance, "0" data is supplied to the 1 side of the selector 38, and consequently, the difference values within the one-line period by the subtractor 32 are stored as sum values of the one line for the first time into the RAM 34.

The divider 35 performs a dividing process for obtaining an average of sum values stored in the RAM 34. The average makes a value of a vertical stripe noise component to be subtracted by the subtractor 37.

The selector 36 is selectively set to the 1 side only within a period within which correction is executed in accordance with the control signal $\phi 3$. Accordingly, a vertical stripe noise component obtained by the divider 35 is supplied to the subtractor 37 within the correction execution period, and a subtraction process of the vertical noise component value from an output value of the digital PGA 20 is performed. The subtraction process makes a noise correction process, that is, a cancellation process of a vertical stripe noise component from the pickup image signals DT.

Operation of the circuit system of FIG. 3 is described with reference to the timing chart of FIG. 4.

Within the one-frame period illustrated in FIG. 4, a reference signal average calculation period T1, a vertical stripe detection period T2 and a vertical stripe correction period T3 are set.

It is to be noted that the pickup image signals DT, vertical synchronizing signal Vsync, horizontal synchronizing signal Hsync and control signals φ1 to φ4 are illustrated in FIG. 4.

Within the reference signal average calculation period T1 and the vertical stripe detection period T2, the pickup image signals DT as a fixed input (for example, data of the dummy pixel) are inputted within the frame. On the other hand, the vertical stripe correction period T3 is a period within which scanning of pixels as optical black (OPB) of the sensor array 1 and scanning of valid pixels of the sensor array 1 are performed. It is to be noted that the vertical stripe correction period T3 should be set so that it may include at least the scanning period for valid pixels.

First, within the reference signal average calculation period T1, the control signal φ1 rises, for example, within the first horizontal line period of a frame.

Within the period T1, an average of the pickup image signals DT based on a fixed value, that is, a reference signal average as a DC component, is calculated by the average arithmetic operation circuit 31.

It is to be noted that, in the example of FIG. 4, a DC level is calculated by calculating an average of the pickup image signals DT for one row, and an error of the reference signal average fluctuates an offset of the overall output image after removal of a vertical stripe. However, since digital clamp for the optical block is further applied with a high degree of accuracy by the digital clamp circuit 8 at the succeeding stage as seen in FIG. 1, the influence of an error appearing here need not much be taken into consideration. Therefore, an average of the pickup image signals DT for one line is not necessarily required for average arithmetic operation for obtaining a DC level as a reference signal average.

Then, the control signal φ2 rises to perform operation within the vertical stripe detection period T2. When the control signal φ2 rises, the RAM 34 is write enabled, and writing (updating) of the RAM 34 as a line memory is performed within the vertical stripe detection period T2.

It is to be noted that, within a first one-line period after the control signal φ2 rises, since the control signal φ4 exhibits "1", 0 data is supplied to the adder 33 through the selector 38. Accordingly, within the period of the first one line, difference values of values of the pickup image signals DT of the individual columns for the one line from the reference signal average calculated by the subtractor 32 are successively stored into the RAM 34 serving as a line memory. Accordingly, within the period of the first line, a number of different values equal to the number of pixels in one line are stored as sum values.

Within the second and succeeding lines after the control signal φ2 rises, the control signal φ4 is set to "0". Accordingly, the selector 38 is selectively set to the 0 side, and consequently, the difference values for one line stored in the RAM 34 are successively supplied to the adder 33.

At this time, the different values regarding the columns for one line at the point of time are outputted from the subtractor 32. Accordingly, the difference value regarding the pixel of the first column of the current line is added to the sum value regarding the pixel of the first column stored in the RAM 34, and the resulting sum value is stored into the RAM 34. Further, the difference value regarding the pixel of the second column of the current line is added to the sum value regarding the pixel of the second column stored in the RAM 34, and the resulting sum value is stored into the RAM 34. This operation is successively performed up to the data of the pixel of the last column.

Accordingly, since the operation within the vertical stripe detection period T2 is successively performed over a predetermined number of horizontal periods (that is, over a plurality of rows) until the control signal φ2 falls, the sum values obtained by the cumulatively adding the difference values are stored as sum values regarding the columns in the RAM 34.

The information stored in the line memory (RAM 34) regarding the sum values, that is, the cumulatively added difference values of the columns, is accumulation information of an offset pattern in the direction of the line and corresponds to a pattern of fixed vertical stripe noise.

Thereafter, operation within the vertical stripe correction period T3 is performed. It is to be noted that, while, in the example described, the scanning period of the optical black (OPB) area and the valid pixel area of the sensor array 1 is determined as the vertical stripe correction period T3, only it is necessary to perform vertical stripe correction at least within the valid pixel period.

Within the vertical stripe correction period T3, the control signal φ3 exhibits the H level. In other words, within the vertical stripe correction period T3, the selector 36 is selectively set to the 1 side. Consequently, the sum values stored in the RAM 34 are subject to division for averaging by the divider 35, and resulting quotient values are successively supplied to the subtractor 37. The quotient values are subtracted from the pickup image signals DT outputted from the digital PGA 20 to remove an offset, that is, vertical stripe noise.

It is to be noted that, since the control signal φ3 has the L level within the reference signal average calculation period T1 and the vertical stripe detection period T2 described hereinabove, 0 data is supplied from the selector 36 to the subtractor 37, and therefore, correction for the pickup image signals DT outputted from the digital PGA 20 is not performed.

Since, within the vertical stripe correction period T3, the control signal φ2 has the low level and updating of the RAM 34 is not performed, the sum values cumulatively added within the vertical stripe detection period T2 are supplied to the divider 35. The divider 35 divides the sum values (cumulatively added values regarding the columns) from the RAM 34 by the number of times of such addition to obtain averages. The averages regarding the columns obtained by the division represent offset levels as fixed pattern noise to the pixel signals of the columns for the one row.

Accordingly, the values of the results of the division (offset levels regarding the columns for the one line) are supplied to the subtractor 37, by which they are subtracted from the signal values for the one line of the pickup image signals DT outputted from the digital PGA 20. The pickup image signals DT for the one line from which the offset components are removed can be obtained thereby. This process is successively performed for the pickup image signals DT for the individual rows within the valid period to remove vertical stripe noise from an image of one frame. In other words, vertical stripe correction is implemented.

According to the operation described above, within a period within which pickup image signals DT based on a fixed value are inputted within one frame period, a reference signal average is calculated from the pickup image signals based on the fixed value (reference signal average calculation period T1).

Then, a process of storing sum values of difference values of the pickup image signals DT based on the fixed value with respect to the reference signal average is performed (vertical stripe detection period T2).

Then, within a period within which the pickup image signals of at least valid pixels are inputted within the one frame period, division averages obtained by dividing the stored sum values are subtracted from the pickup image signals DT to perform vertical stripe correction (vertical stripe correction period T3).

In the operation described, for detection of a vertical stripe component, a difference value between a reference signal average and an input value is cumulatively added.

Although a fixed input signal is used to store an offset component originating from a vertical stripe and an arithmetic average is calculated, since only a dispersion component which makes a vertical stripe is a required value, the DC level of the input signal (pickup image signal DT) is not required. Further, if not a difference but an input signal is cumulatively added, then a comparatively great RAM capacity is required, which is not efficient. Thus, where a DC level of an input signal is calculated as a reference signal average first and a cumulative value of difference values with respect to the reference signal average is stored into the RAM 34 as in the present example, an efficient process is implemented without requiring a great RAM capacity. Furthermore, cumulative addition of a difference value provides the possibility of a greater number of times of successive addition even with a small RAM capacity, and consequently, the accuracy in detection within the vertical stripe detection period T2 can be raised to raise the accuracy in correction.

Second Embodiment

In the process according to the first embodiment described above, to raise the averaging accuracy, it is necessary to provide the vertical stripe detection period T2 as a period for a number of rows as great as possible within one frame. However, as the number of lines increases within the vertical stripe detection period T2, this suppresses the operation frequency or frame rate and is not preferable.

Therefore, the invalid pixel period for vertical stripe detection within one frame cannot be increased very much. Consequently, under certain circumstances, the accuracy in addition average is not sometimes assured sufficiently.

Therefore, the second embodiment implements a configuration which can assure the accuracy in arithmetic averaging without the necessity for a long invalid pixel period for vertical stripe detection within one frame.

Figure 5:
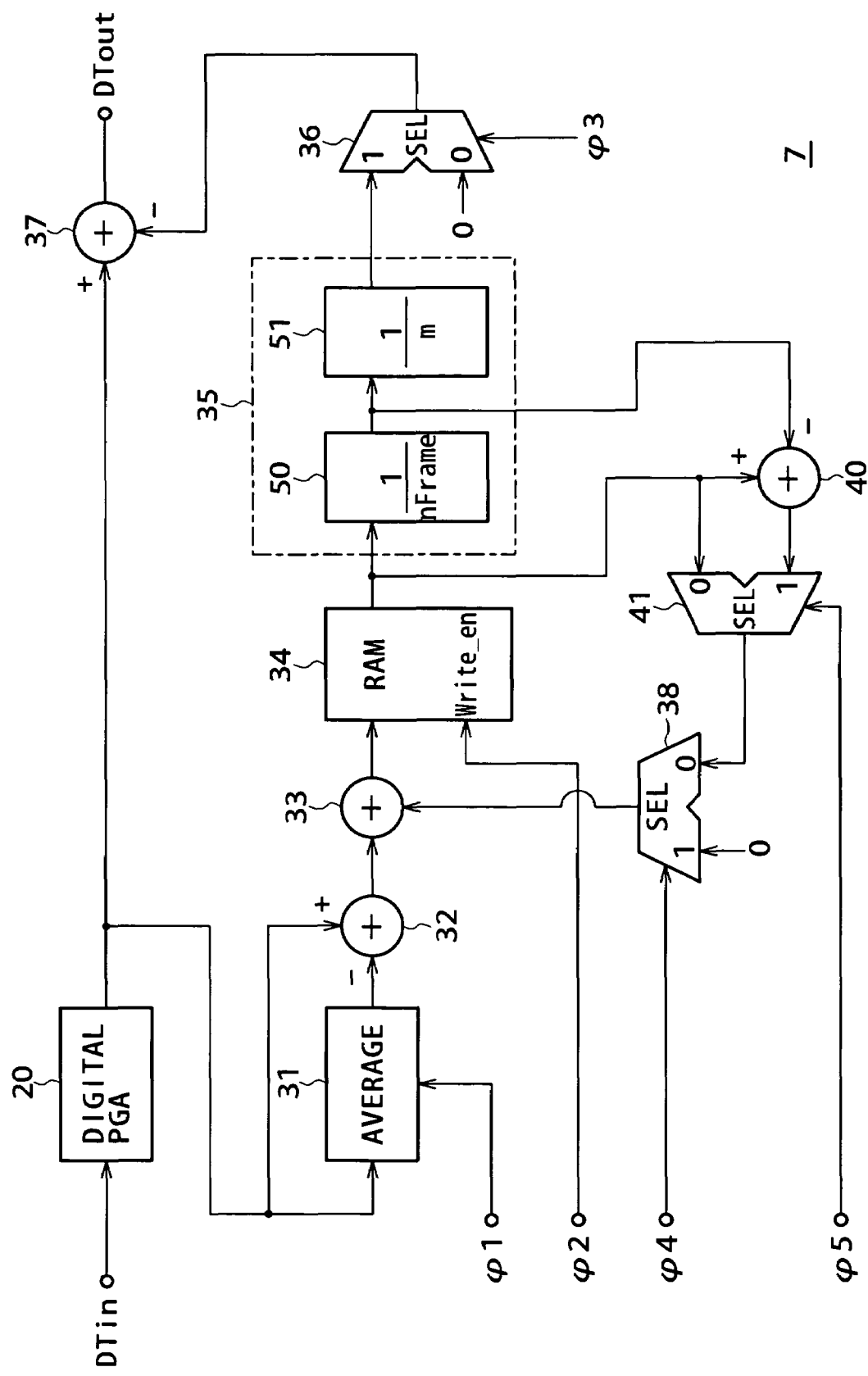
FIG. 5 is a block diagram of a digital PGA/vertical stripe cancellation circuit of a solid-image pickup apparatus according to a second embodiment of the present invention.

FIG. 5 shows a configuration of the digital PGA/vertical stripe cancel circuit 7 of the solid-state image pickup apparatus according to the second embodiment of the present invention.

Referring to FIG. 5, the digital PGA/vertical stripe cancel circuit 7 shown includes a subtractor 40 and a selector 41 in addition to the components of the digital PGA/vertical stripe cancel circuit 7 shown in FIG. 3. The selector 41 is controlled with a control signal $\phi 5$. Further, the divider 35 includes a 1/nFrame divider 50 and a 1/m divider 51.

The 1/nFrame divider 50 divides the sum values stored in the RAM 34 by the frame number nFrame by which cumulative addition is performed with regard to the sum values.

"m" of the 1/m divider 51 represents the number of times of cumulative addition within one frame with regard to the sum values stored in the RAM 34.

An output of the 1/nFrame divider 50 is supplied to the 1/m divider 51 and also to the subtractor 40. The subtractor 40 successively subtracts the output of the 1/nFrame divider 50 from the sum values from the RAM 34.

An outline of a process by the digital PGA/vertical stripe cancel circuit 7 having the configuration described above is described. In particular, the number of times of cumulative addition by the adder 33 is not cleared in one frame, but is successively incremented also in the succeeding frames.

This increases the added number of difference values to raise the accuracy in averaging. However, if such addition is performed by an excessively great number of times, then the RAM 34 is saturated. Accordingly, the number of times of cumulative addition is restricted by the range of the RAM 34 and the absolute amount of vertical stripes.

Further, if random noise decreases to substantially $1/8$ to $1/10$, then a vertical stripe is buried into random noise and it becomes less likely to be recognized readily on an output image. Therefore, it is considered substantially sufficient if cumulative addition is performed by more than 100 times which is a reciprocal to the number ($1/8$ to $1/10$) mentioned above.

Thus, in the digital PGA/vertical stripe cancel circuit 7 shown in FIG. 5, taking the facility in digital division into consideration, the adder 33 performs addition by totaling 128 times. Where the number of times of cumulative addition within one frame is 16, 128 times of addition are performed if the cumulative addition is performed for eight frames.

In the following, operation of the digital PGA/vertical stripe cancel circuit 7 shown in FIG. 5 wherein successive cumulative addition is performed by 128 times (8 frames) in this manner is described with reference to FIGS. 6A and 6B. It is to be noted that FIG. 6A illustrates a variation of the frame number nFrame by the 1/nFrame divider 50 and the control signals $\phi 4$ and $\phi 5$ within a vertical period, and FIG. 6B illustrates signal waveforms within a one-frame period similarly to FIG. 4.

Within the first frame period (first frame) within which a vertical stripe correction process is started, the control signal $\phi 4$ rises as seen in FIG. 6A. As seen from FIG. 6B in which waveforms within the frame period of the control signal $\phi 4$ are shown, the control signal $\phi 4$ has the H level within a period of the first one line within the vertical stripe detection period T2.

It is to be noted that, as seen from FIG. 6A, the control signal $\phi 4$ does not rise in the second and succeeding frames. As described hereinabove in connection with the first embodiment, the control of the selector 38 with the control signal $\phi 4$ has a significance of resetting of the stored values of the RAM 34. For example, in the waveforms of FIG. 4 according to the first embodiment, the control signal $\phi 4$ exhibits, for each frame, the H level within the first line period within the vertical stripe detection period T2. This causes resetting of the sum values of the RAM 34 for each frame.

However, that the control signal $\phi 4$ rises only in the first frame as seen in FIG. 6B signifies that the stored values (sum values) of the RAM 34 are not reset over a plurality of frames but are continuously cumulatively added as seen from FIG. 6A.

Within the period of the first frame of FIGS. 6A and 6B, addition of difference values is performed by 16 times within the vertical stripe detection period T2 of FIG. 6B. In other words, difference values for the first row are stored as they are into the RAM 34 since 0 data is supplied from the selector 38 to the adder 33 in accordance with the control signal $\phi 4$.

Further, within the period of the first frame, as can be seen from FIG. 6A, the control signal $\phi 5$ does not rise. Accordingly, the selector 41 normally selects the 0 side (output of the RAM 34). Then, within the periods of the second and succeeding lines of the first frame, the control signal φ4 exhibits the L level, and consequently, the stored values of the RAM 34 are fed back to the adder 33 through the selectors 41 and 38. Consequently, within the periods of the second and succeeding lines, the cumulative addition of difference values is repeated up to the 16th line with which the vertical stripe detection period T2 ends.

Within the vertical stripe correction period T3 in the first frame, correction with the sum values obtained by the addition by 16 times is performed. Here, as seen from FIG. 6A, the value of the frame number nFrame of the 1/nFrame divider 50 is updated to 1, 2, 3, . . . , 8 from the first frame with which the correction is started to the eighth frame. In the ninth and succeeding frames, however, the value of the frame number nFrame remains "8".

The sum values stored in the RAM 34 within the vertical stripe detection period T2 in the first frame are sum values for one frame. Meanwhile, the 1/nFrame divider 50 is an element for calculating the sum values for one frame. Within the period of the first frame, the 1/nFrame divider 50 serves as a 1/1 divider, and the sum values obtained by the addition by 16 times and stored in the RAM 34 are outputted.

As described above, "m" of the 1/m divider 51 represents the number of times of addition within a one-frame period and is 16 in the digital PGA/vertical stripe cancel circuit 7 of FIG. 5.

Accordingly, averages of the sum values obtained by addition by 16 times are outputted from the 1/m divider 51.

The averages are offset components as vertical stripe noise similarly as in the digital PGA/vertical stripe cancel circuit 7 of the first embodiment. The averages are successively supplied to the subtractor 37 through the selector 36 within the vertical stripe correction period T3 of the first frame so that vertical stripe correction is performed.

Then, within the second frame of FIG. 6A, since the control signal φ4 cannot rise, the sum values in the RAM 34 are not reset. Accordingly, within the vertical stripe detection period T2 in the second frame, addition is performed further by 16 times. As a result, sum values by successive addition by totaling 32 times are stored in the RAM 34.

Since the value of the frame number nFrame is change to "2" within the period of the second frame, within the vertical stripe correction period T3 for the second frame, the 1/nFrame divider 50 serves as a ½ divider. The divider 50 outputs sum values corresponding to ½ those by addition by 32 times stored in the RAM 34, that is, sum values corresponding to one frame (that is, sum values by addition by 16 times).

Then, averages of the sum values by addition by 16 times are calculated by and outputted from the 1/m divider 51. The averages are supplied to the subtractor 37 through the selector 36 within the vertical stripe correction period T3 of the second frame to perform vertical stripe correction.

Thereafter, within each of the third to eighth frames, difference values are successively cumulatively added within the vertical stripe detection period T2. Accordingly, the sum values are stored into the RAM 34 such that 48-time added sum values are stored in the third frame; 64-time added sum values are stored in the fourth frame; 80-time added sum values are stored in the fifth frame; . . . ; and 128-time added sum values are stored in the eighth frame.

Naturally, within the vertical stripe correction period T3 in each of the frame periods, the value of the frame number nFrame is updated. Accordingly, sum values corresponding to one frame (=addition by 16 times) are obtained by the 1/nFrame divider 50. Then, averages of the 16-time added sum values are calculated by and outputted from the 1/m divider 51. The averages are supplied to the subtractor 37 so that vertical stripe correction is performed by the subtractor 37.

As seen in FIG. 6A, the control signal φ5 rises in each of the ninth and succeeding frames. Within the period in each frame, the control signal φ5 rises at a time illustrated in FIG. 6B, that is, within the period of the first one line within the vertical stripe detection period T2.

Within the period within which the control signal φ5 has the H level, the difference values obtained by subtracting the output of the 1/nFrame divider 50 from the sum values of the RAM 34 by the subtractor 40 are fed back to the adder 33.

Further, after the value of the frame number nFrame changes to "8" in the eighth frame, the value "8" is determined as a limit value and retained also in the succeeding frames as seen in FIG. 6A.

Then, at the point of time at which the ninth frame is started, the sum values in the RAM 34 are 128-time added values. Further, the 1/nFrame divider 50 performs ⅛ division (division by 8) and outputs sum values corresponding to one frame. Accordingly, the values outputted from the subtractor 40 are sum values corresponding to ⅞ frames. In other words, the values substantially correspond to 112-time added values.

In other words, within the vertical stripe detection period T2 in the ninth frame, addition of difference values to the 112-time added values is performed and the sum values in the RAM 34 are updated with the 113-time added values. Within the periods in the next line to the 16th line, the control signal φ5 is kept at the L level. Consequently, the sum values of the RAM 34 are successively fed back and the difference values are successively added. Finally, at the point of time when the vertical stripe detection period T2 comes to an end, the sum values by addition by 128 times are stored in the RAM 34.

Then, since the value of the frame number nFrame is "8" within the vertical stripe correction period T3 in the ninth frame, the 1/nFrame divider 50 serves as a ⅛ divider. The divider 50 outputs sum values corresponding to ⅛ those by addition by 128 times stored in the RAM 34, that is, sum values corresponding to one frame (that is, sum values by addition by 16 times). Then, averages of the sum values by addition by 16 times are calculated by and outputted from the 1/m divider 51. The averages are supplied to the subtractor 37 through the selector 36 within the vertical stripe correction period T3 of the ninth frame to perform vertical stripe correction.

Thereafter, similar operation to that in the ninth frame is performed also in the 10th frame and the 11th frame. Accordingly, after the eighth frame in which addition is performed by totaling 128 times, while the 128-time added values are kept, vertical stripe correction is performed with averages of the 128-time added values.

As described above, in the digital PGA/vertical stripe cancel circuit 7 described above with reference to FIG. 5, while the 128-time added values are maintained, averages of them are used as subtraction values for correction.

In this instance, since a vertical noise component of a sufficiently high degree of accuracy can be detected from 128-time added values, the accuracy in correction processing can be improved using the detected vertical noise component. Further, in the ninth and succeeding frames, values equivalent to sum values for one frame are subtracted from the sum values for eight frames in the past. Then, the difference values in the current frame are newly added to update the sum values of the RAM 34. Consequently, the follow-up performance for various situations is also assured. For example, even if the amount of vertical stripes varies in response to a variation of the power supply voltage or a temperature variation, the vertical stripe noise correction can follow up the variation.

Particular examples of various numerical values such as, for example, addition by 16 times per one frame and 128-time added values are used as above. However, optimum values suitable for the system or the needs should be used because those values have an influence on the speed of response or the detection accuracy of the first frame when the vertical stripe detection is performed again.

Incidentally, in the case of the process of the digital PGA/vertical stripe cancel circuit 7 of the solid-state image pickup apparatus according to the second embodiment, when correction is re-performed, that is, at an instant when the frame number nFrame is set to nFrame=1 so that correction is re-performed beginning with the first frame in FIG. 6A, since the number of times of addition is small, the averaging accuracy is deteriorated at a moment. This is because, for example, eight frames are required until the number of times of addition reaches 128.

On the other hand, if the gain value varies during image pickup in such a case wherein automatic gain control is used, the amount of vertical stripes varies suddenly. Particularly when only the digital gain varies, the amount of vertical stripes also increases simply in proportion to the gain. However, if the analog gain varies, then it is difficult to accurately forecast the amount of variation of the amount of vertical stripes. Therefore, it is essentially required to re-perform detection of the amount of vertical strikes at a timing of variation of the analog gain.

Figure 2:
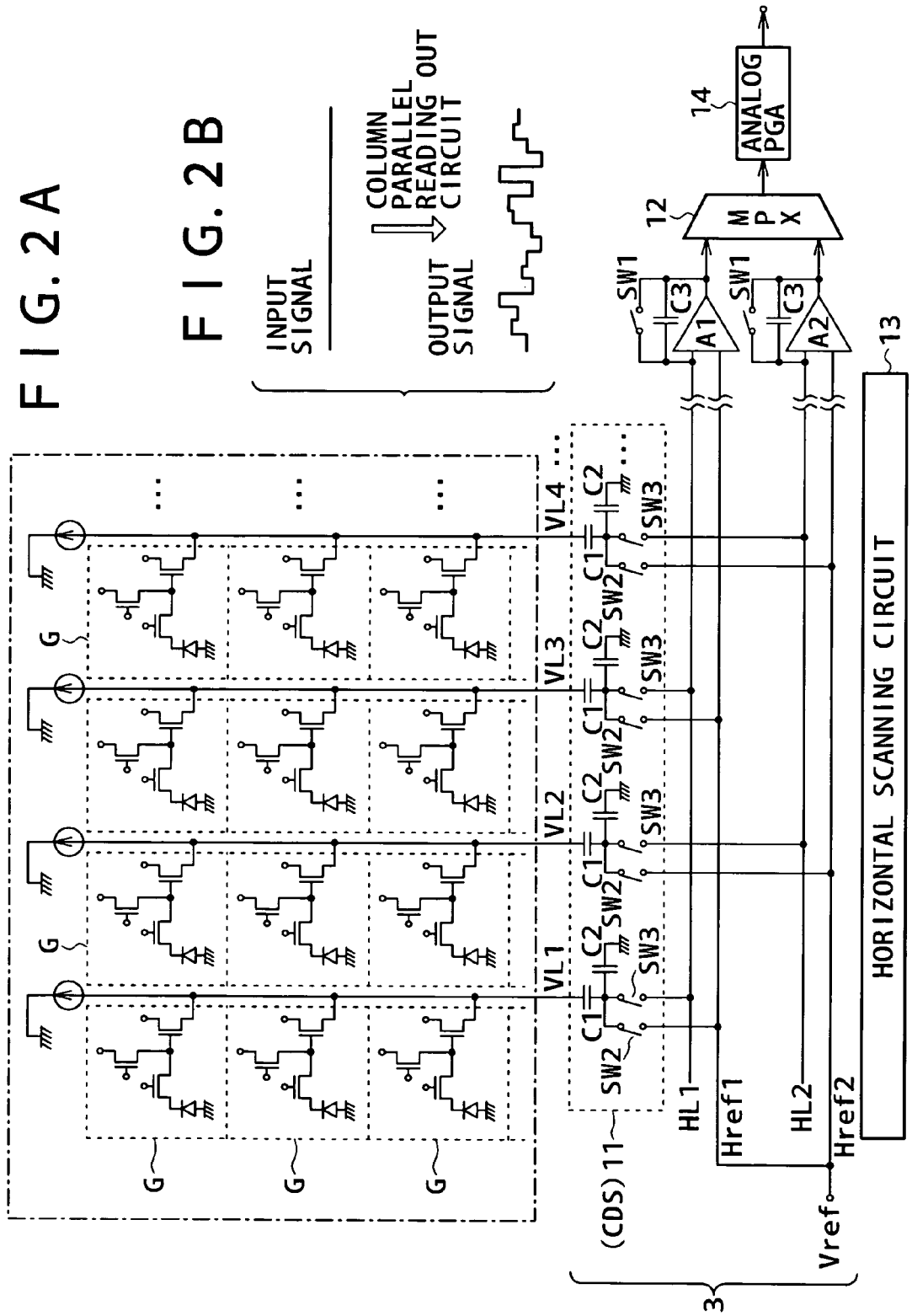
FIG. 2A is a block diagram of a sensor array and a column reading out circuit/analog PGA shown in FIG. 1
FIG. 2B is a waveform diagram illustrating waveforms of an input signal to and an output signal from a parallel processing circuit of the column reading out circuit/analog PGA.

Therefore, the system should be configured such that the step size of the analog gain of the analog PGA 14 shown in FIG. 2 is set to a great size of, for example, 6 dB while the step size of the digital gain of the digital PGA 20 is set to a small size of, for example, 0.1 dB. Where the step sizes are set in this manner, the probability of the variation of the analog gain decreases and the probability of occurrence of the necessity for re-detection of a vertical stripe decreases. In other words, the opportunity wherein the averaging accuracy is deteriorated instantaneously is minimized and the influence on the picture quality can be reduced by the process described above. Besides, the efficiency of the process can be promoted. Further, the configuration described can achieve facilitation in design of an analog circuit.

Third Embodiment

The third embodiment relates to arrangement of the digital PGA 20 in the digital PGA/vertical stripe cancel circuit 7.

FIGS. 7A, 7B and 7C show a circuit portion of the solid-state image pickup apparatus including the analog PGA 14, A/D converter 4 and digital PGA/vertical stripe cancel circuit 7 in a simplified form. As a block corresponding to the digital PGA/vertical stripe cancel circuit 7, the digital PGA 20 and the correction processing system (average arithmetic operation circuit 31, subtractor 32, adder 33, RAM 34, divider 35 and subtractor 37). Although the selector 38 and so forth are omitted in FIGS. 7A, 7B and 7C, it should be recognized that the processing system shown in FIG. 3 or 5 is shown schematically.

Particularly for the convenience of description below, the average arithmetic operation circuit 31, subtractor 32, adder 33 and RAM 34 are collectively referred to as detection section DTC. Meanwhile, the divider 35 and subtractor 37 are collectively referred to as correction section CL.

Further, from the point of view to use a large analog gain step size as described above, the analog PGA 14 can be variably set among four step sizes different by 6 dB from each other, that is, to 0 dB, 6 dB, 12 dB and 18 dB. Meanwhile, the digital PGA 20 can be variably set among 20 step sizes different by 0.1 dB from each other, that is, to 0 dB to 5.9 dB.

FIG. 7A shows a configuration wherein the digital PGA 20 is disposed at the next stage to the correction section CL.

FIG. 7B shows another configuration wherein an output of the digital PGA 20 is inputted to the correction processing system (detection section DTC and correction section CL) as in the example of FIG. 3 or 5.

FIG. 7C shows a further configuration wherein the digital PGA 20 is interposed between the detection section DTC and the correction section CL.

Where a correction process is performed as in the solid-state image pickup apparatus of the first or second embodiment described hereinabove, each digital value (sum value) itself stored in the RAM 34 through vertical stripe detection is obliged to include an error of ±1 digit due to a quantization error or rounding in arithmetic operation.

Suppose that: a vertical stripe is detected by the detection section DTC before a digital gain is applied; then, vertical stripe correction is performed by the correction section CL; thereafter, the digital gain is applied to the corrected value as seen from FIG. 7A. Then, the gain is applied also to the limit accuracy. Therefore, for example, if a doubled digital gain is applied, then the vertical stripe correction limit expands to +2 digits.

Suppose that a digital gain is applied by the digital PGA 20 and then detection and correction of vertical stripes are performed by the detection section DTC and the correction section CL, respectively, as seen in FIG. 7B. Then, the digital gain is not applied theoretically to the limit error itself after the gain application.

However, according to the arrangement just described, every time the digital gain changes, it is necessary to re-detect a vertical stripe. This sometimes results in failure to obtain an object of the system which uses a great analog gain step size described above.

Therefore, in the solid-state image pickup apparatus of the third embodiment, the digital PGA 20 is interposed between the detection section DTC and the correction section CL as seen in FIG. 7C.

The arrangement provides a processing system wherein a digital gain equal to a digital gain of the system (a digital gain to be applied to the pickup image signals DT) is applied to the sum values of the RAM 34 which are vertical stripe integrated amounts and then the division for averaging is performed by the divider 35 and a resulting value of the division is determined as a vertical stripe amount.

A gain is applied prior to division by the divider 35. It signifies that a gain can be applied also to a fractional value which is to be truncated (rounded off) after division where the division is performed prior to application of the gain. If the division is performed later, then the accuracy in averaging is not deteriorated.

Further, according to the configuration of FIG. 7C, since the vertical stripe amount (sum values) is detected by the detection section DTC before a digital gain is applied by the digital PGA 20, when the digital gain varies, there is no necessity to newly detect the vertical stripe amount. Further, it is possible to prevent the correction limit accuracy by a digital processing error from being deteriorated by the digital gain.

It is to be noted that, where there is no necessity to newly detect the vertical stripe amount when the digital gain varies, it is made effective to increase the step size of the analog gain and decrease the digital gain step size. In other words, if the opportunity of gain variation with the analog PGA 14 is reduced and the gain is adjusted finely by the digital PGA 20, then the opportunity of re-setting of correction decreases.

Figure 8:
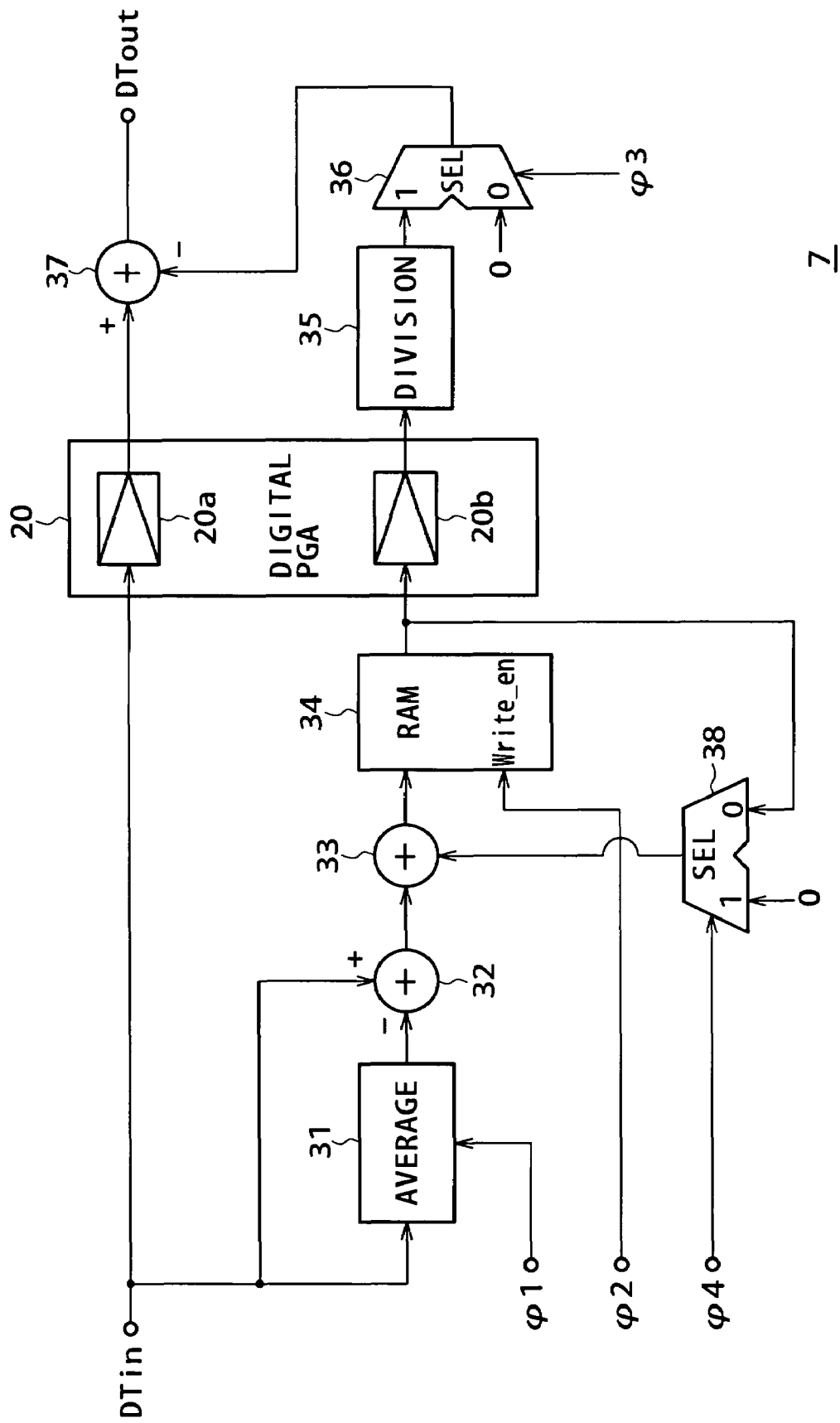
FIG. 8 is a block diagram of a digital PGA/vertical stripe cancellation circuit of a solid-image pickup apparatus according to a third embodiment of the present invention.

A configuration where the configuration example described hereinabove with reference to FIG. 3 is modified such that the digital PGA 20 is interposed between the detection section DTC and the correction section CL as seen in FIG. 7C is shown in FIG. 8.

Referring to FIG. 8, the digital PGA 20 includes a gain processing section 20a for a pickup image signal DTin inputted thereto and another20aby gain processing section 20b for sum values of the RAM 34. The gain processing sections 20a and 20b apply an equal gain to the input.

Averages of the sum values of the RAM 34 are determined by the divider 35 after a digital gain is applied to the sum values by the gain processing section 20b and are supplied to the subtractor 37 through the selector 36. Further, the pickup image signal DTin inputted is supplied, after a digital gain is applied thereto by the gain processing section 20a, to the subtractor 37, by which subtraction of the averages (vertical stripe noise components) determined by the divider 35 from the pickup image signal DTin is performed.

Fourth Embodiment

The fourth embodiment is directed to a processing system which adds noise to a vertical stripe correction amount to apparently moderate the digital correction limit.

As described hereinabove, vertical stripe correction gives rise to a correction limit of +1 digit for the convenience of arithmetic operation of integers, and in a system wherein the A/D converter 4 has a resolution which is not very high such as 9 bits or 10 bits, this error looks as a vertical stripe.

Figure 9:
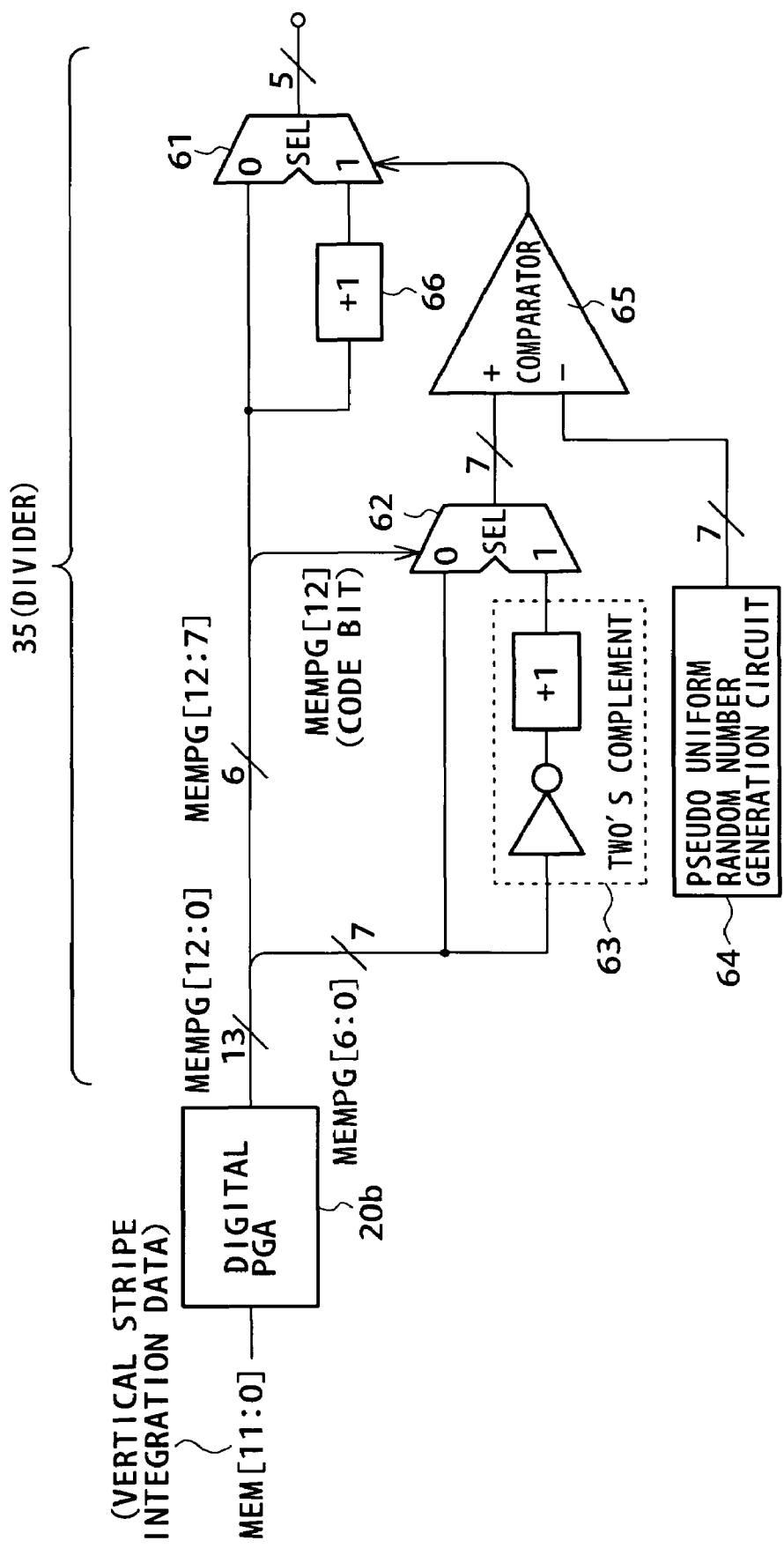
FIG. 9 is a block diagram of a divider of a solid-image pickup apparatus according to a fourth embodiment of the present invention.

A configuration for making such a vertical stripe less conspicuous is shown in FIG. 9. While FIG. 9 shows an example of a configuration of the divider 35 in the embodiments described hereinabove, the digital PGA 20 (gain processing section 20b) is disposed at the preceding stage to the divider 35 as in the example of FIG. 7C.

Vertical stripe integration data inputted are sum values stored in the RAM 34, and here, represented as data MEM [11:0], that is, 12-bit data of bit 0 to bit 11. This is based on an assumption that the data here are data obtained by addition by 128 times as described hereinabove in connection with the second embodiment and are formed from 12 bits with a sign.

If the output of the digital PGA 20 (20b) is data MEMPG [12:0], then the data MEMPG [12] which is the MSB is used as a sign bit, and the data MEMPG [12:0] is 13-bit data including the sign bit.

Average division (1/128) for a 128-time added value becomes right shift arithmetic operation of 7 bits. Accordingly, the data MEMPG [12:7] of the higher order 6 bits is an average division value, and the data MEMPG [6:0] of the lower 7 bits is cut off.

The data MEMPG [11:7] of 5 bits except the sign bit from within the data MEMPG [12:7] as an average is inputted to the 0 side of a selector 61, and is further inputted to the 1 side of the selector 61 after it is incremented by +1 by a +1 adder 66.

The selector 61 selects the input to the 0 side or the 1 side and outputs an average of 5 bits as a subtraction value for vertical stripe correction. In other words, this is a value to be supplied to the subtractor 37 through the selector 36 in FIG. 3, 5 or 8.

Meanwhile, the data MEMPG [6:0] of the low order 7 bits cut off by average division is inputted to the 0 side of a selector 62, and then, a two's complement of the data MEMPG [6:0] is determined by a complement section 63, whereafter the resulting data is inputted to the 1 side of the selector 62. The selector 62 is selectively set to the 0 side or the 1 side depending upon the MSB (MEMPG [12]) which is the sign bit.

In short, the selector 62 outputs an absolute value of the cut off amount.

The absolute value data of 7 bits from the selector 62 is supplied to a comparator 65.

Further, a pseudo uniform random number generation circuit 64 is provided, and a uniform random number generated by the pseudo uniform random number generation circuit 64 is supplied to the comparator 65. The pseudo-uniform random number has a bit length equal to that of the cut out amount by the division, that is, a 7-bit length. For the uniform random number, a popular M series algorithm may be used as a random number generation algorithm.

The comparator 65 compares the absolute value of the cut out amount and the uniform random number with each other and outputs a result of the comparison as a selection control signal to the selector 61.

According to the configuration described above, the selector 61 selectively outputs an average itself of the data MEMPG [11:7] as an average obtained by the division and a value obtained by adding +1 to the average.

In particular, the selector 61 selects the 0 side or the 1 side at random to add 0 or 1 at random to a subtraction value (vertical stripe amount to be subtracted) for correction.

By adding a small amount of random noise in this manner, fixed pattern noise can be made less conspicuous.

Further, in the example of FIG. 9, the rate of addition of noise (rate at which the 1 side is to be selected) in the random selection of the selector 61 is varied in proportion to the value to be cut off by the division.

In particular, since the absolute value of the cut out amount and the random number are compared with each other and the selector 61 is selectively set in response to a result of the comparison, while the selector 61 performs selection at random, as the amount to be cut off increases, the probability that the 1 side, that is, the +1 noise addition side, is selected increases, but conversely as the amount to be cut off decreases, the probability that noise is added decreases.

This makes it possible for a value obtained by determining an average of the vertical stripe amount after correction to artificially raise the correction limit accuracy.

Fifth Embodiment

The fifth embodiment provides an example of the digital PGA/vertical stripe cancel circuit 7 for vertical stripe correction incorporated in a system having a plurality of gain values in one screen.

For various applications such as for a wide dynamic range image, for improvement of the S/N ratio or for a white balance process, pixel signals are sometimes read out with several different gain settings in one frame. In this instance, it is necessary to perform correction of fixed pattern noise arising from parallel reading in different manners for the different settings for the pixels. This is because the vertical stripe amount is different among the different set gains.

Figure 10:
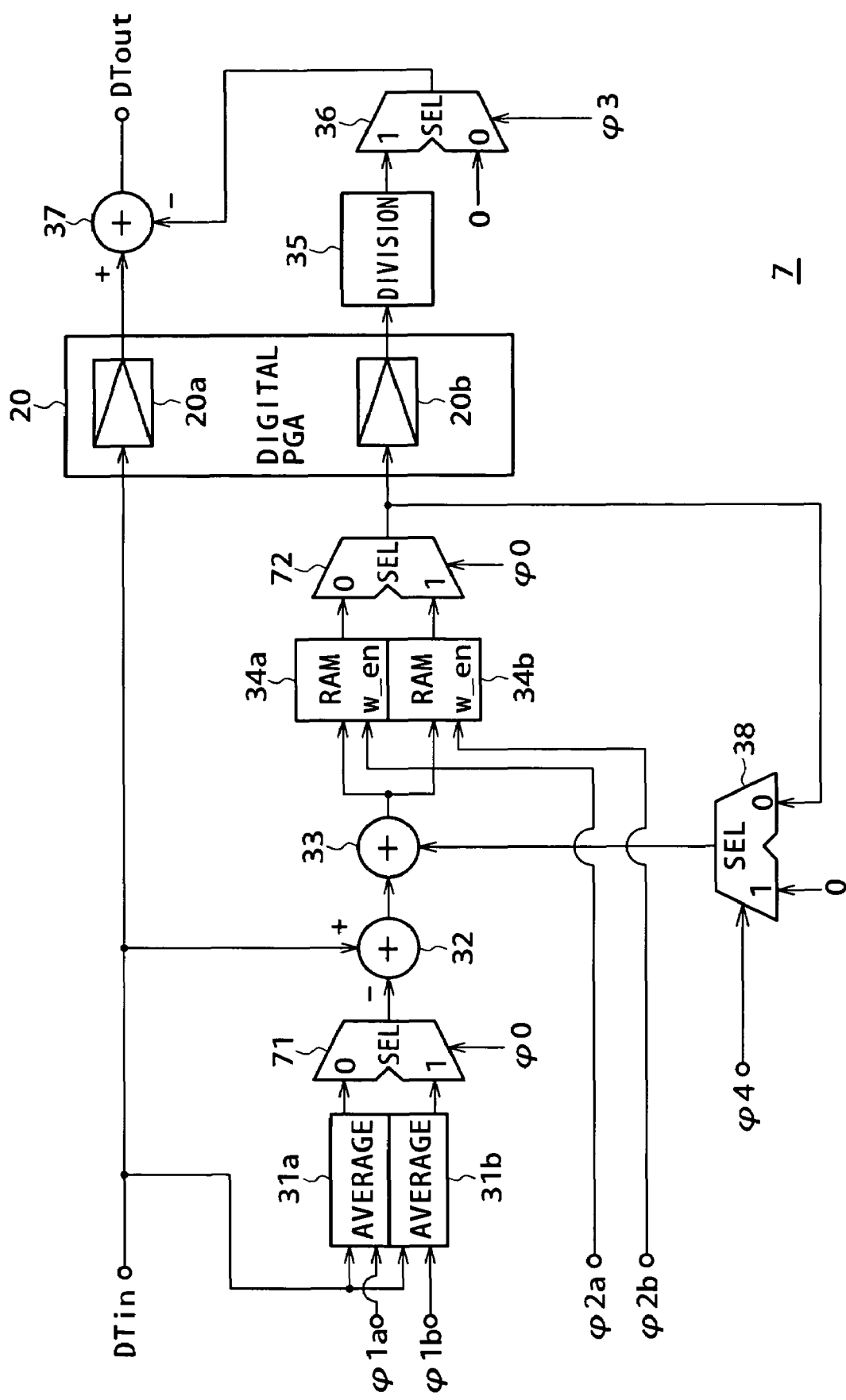
FIG. 10 is a block diagram of a digital PGA/vertical stripe cancellation circuit of a solid-image pickup apparatus according to a fifth embodiment of the present invention.

An example of a configuration of the digital PGA/vertical stripe cancel circuit 7 which is ready for the system which has a plurality of gain patterns in this manner is shown in FIG. 10. It is to be noted that one of two gain patterns is set to each of the pixels.

The configuration of the digital PGA/vertical stripe cancel circuit 7 shown in FIG. 10 is a modification to the configuration of the digital PGA/vertical stripe cancel circuit 7 shown in FIG. 8 wherein it is ready for two gain patterns. To this end, the digital PGA/vertical stripe cancel circuit 7 shown in FIG. 10 includes average arithmetic operation circuits 31a and 31b and RAMs 34a and 34b. Further, selectors 71 and 72 are provided for the average arithmetic operation circuits 31a and 31b and the RAMs 34a and 34b, respectively.

Where the gains for the two gain patterns are represented by Ga and Gb, the average arithmetic operation circuit 31a performs calculation of a reference signal average with regard to the pixels of the gain Ga within a period indicated by a control signal φ1a. Meanwhile, the average arithmetic operation circuit 31b performs calculation of a reference signal average with regard to the pixels of the gain Gb within a period indicated by a control signal φ1b.

The RAM 34a is controlled to a write-enable state within a difference value addition period for the pixels of the gain Ga with a control signal φ2a. The RAM 34b is controlled to a write-enable state within a difference value addition period for the pixels of the gain Gb with a control signal φ2b.

The selectors 71 and 72 perform selection with a control signal φ0. The selector 71 is controlled to select the average arithmetic operation circuit 31a side upon calculation of difference values with regard to the pixels of the gain Ga and select the average arithmetic operation circuit 31b side upon calculation of difference values with regard to the pixels of the gain Gb.

On the other hand, the selector 72 is controlled to select the RAM 34a side within the period of addition of difference values with regard to the pixels of the gain Ga and within the period of vertical stripe correction and select the RAM 34b side within the period addition of difference values with regard to the pixels of the gain Gb and within the period of vertical stripe correction.

An example of operation of the digital PGA/vertical stripe cancel circuit 7 of FIG. 10 is described with reference to FIGS. 11 and 12A.

FIG. 12A illustrates pixels of the gains Ga and Gb. While, in the embodiments described hereinabove, the reference signal average calculation period T1 and the vertical stripe detection period T2 are used, for example, as a scanning period of, for example, dummy pixels, in FIG. 12A, the pixels within the period are set as the pixels of the gain Ga and the pixels of the gain Gb in every other lines.

On the other hand, within the OPB and valid pixel areas, the pixels are set to the pixels of the gain Ga and the pixels of the gain Gb alternately in the vertical and horizontal directions.

Figure 11:
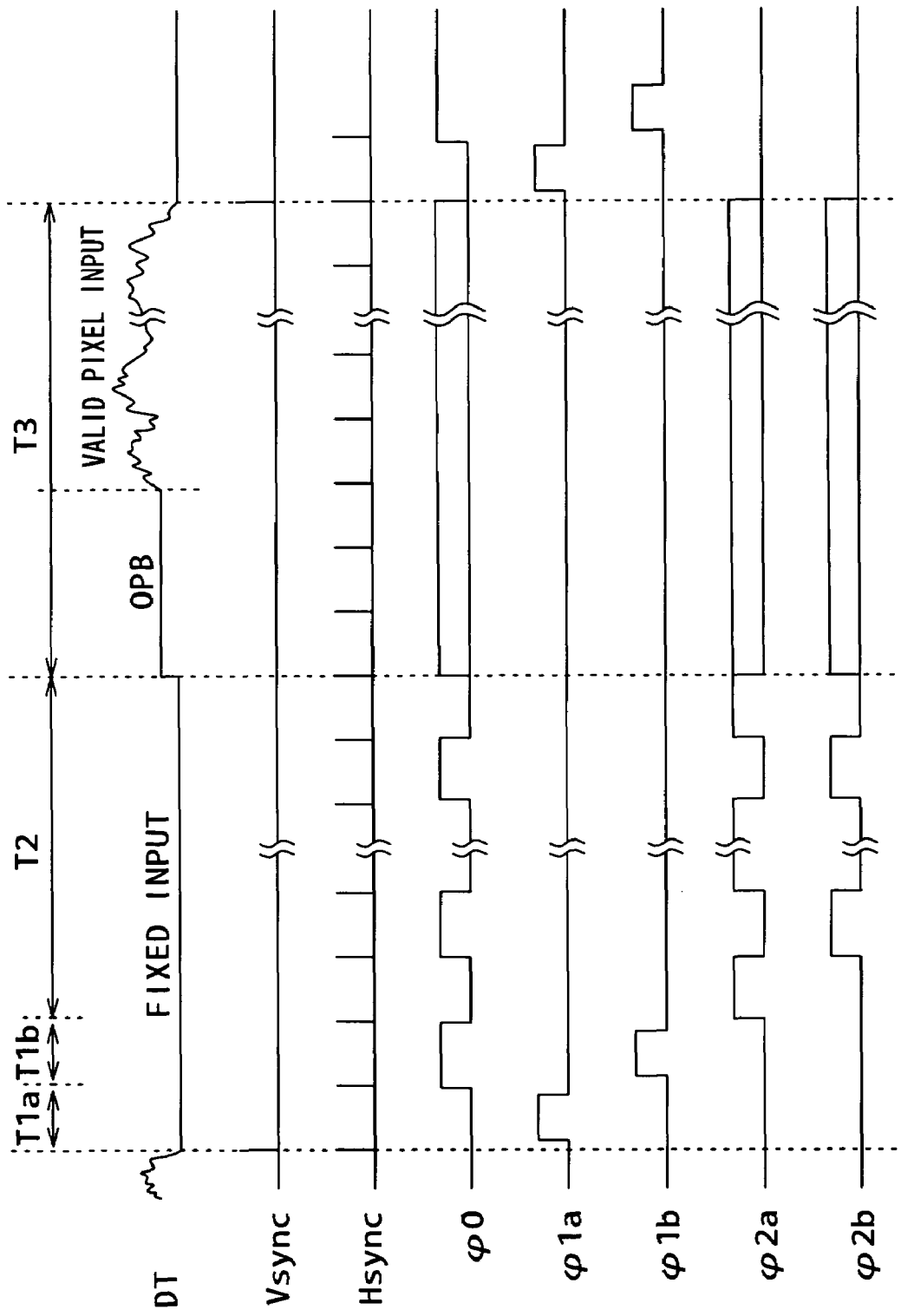
FIG. 11 is a waveform diagram illustrating correction operation of the digital PGA/vertical stripe cancellation circuit of FIG. 10.

A period within which the control signal φ1a has a risen state in FIG. 11 is a reference signal average calculation period T1a with regard to the pixels of the gain Ga. The reference signal average calculation period T1a is, for example, a period of the first line in FIG. 12A, and within this period, calculation of a reference signal average is performed by the average arithmetic operation circuit 31a.

The second line in FIG. 12B is a line of the pixels of the gain Gb. Within the period of the second line, a control signal φ1b rises, and the period is used as a reference signal average calculation period T1a with regard to the pixels of the gain Gb. Thus, within the period, calculation of a reference signal average is performed by the average arithmetic operation circuit 31b.

The third, fifth, seventh, . . . lines of FIG. 12A are for the pixels of the gain Ga. The period of each of the lines makes a vertical stripe detection period T2 with regard to the pixels of the gain Ga. In particular, a control signal φ2a rises for each of the lines as seen in FIG. 11, and addition of difference values and updating of the sum values of the RAM 34a is performed.

The fourth, sixth, eighth, . . . lines of FIG. 12A are for the pixels of the gain Gb. The period of each of the lines makes a vertical stripe detection period T2 with regard to the pixels of the gain Gb. In particular, a control signal φ2b rises for each of the lines as seen in FIG. 11, and addition of difference values and updating of the sum values of the RAM 34b is performed.

By the operation within the reference signal average calculation period T1 (T1a and T1b) and the vertical stripe detection period T2, offset components with regard to the pixels of the gain Ga are obtained as sum values of the RAM 34a and offset components with regard to the pixels of the gain Gb are obtained as sum values of the RAM 34b.

Within the vertical stripe correction period T3, the selector 72 is switched in response to the gain set value (Ga or Gb) corresponding to each pixel within the OPB and valid pixel areas, and the sum values of the RAM 34a or 34b are supplied to and averaged by the divider 35. The resulting averages are supplied to the subtractor 37, by which correction is performed similarly as in the embodiments described hereinabove.

According to the configuration of the digital PGA/vertical stripe cancel circuit 7 of FIG. 10 described above, where two gain patterns are set, vertical stripe noise correction can be performed for gain settings of the individual pixels.

Naturally, while the system described above involves two different gain pattern settings, where three or more gain pattern settings are involved, the average arithmetic operation circuit 31 and the RAM 34 (line memory) should be provided corresponding to each of the patterns.

It is to be noted that, although the system described above is configured such that sum values (vertical stripe integration amounts) corresponding to the individual gains are first called from the plural RAMs 34a and 34b and then selected by the selector 72, it is otherwise possible to input gain setting information to memory address control circuits for the RAMs 34a and 34b to control memory addressing to extract a desired value directly from the RAMs 34a and 34b.

Further, while, in the case of FIG. 12A, the gain setting value is changed for each row to detect a vertical stripe amount within the vertical stripe detection period T2, it is otherwise possible to first set a predetermined number of consecutive rows as a scanning period for the pixels of the gain Ga so that processes for the reference signal average calculation period T1a and the reference signal average calculation period T2a regarding the gain Gb are performed within the scanning period and then set a predetermined number of consecutive rows as a scanning period for the pixels of the gain Gb so that processes for a reference signal average calculation period T1b and a reference signal average calculation period T2b regarding the gain Gb are performed within the scanning period.

Sixth Embodiment

Figure 13:
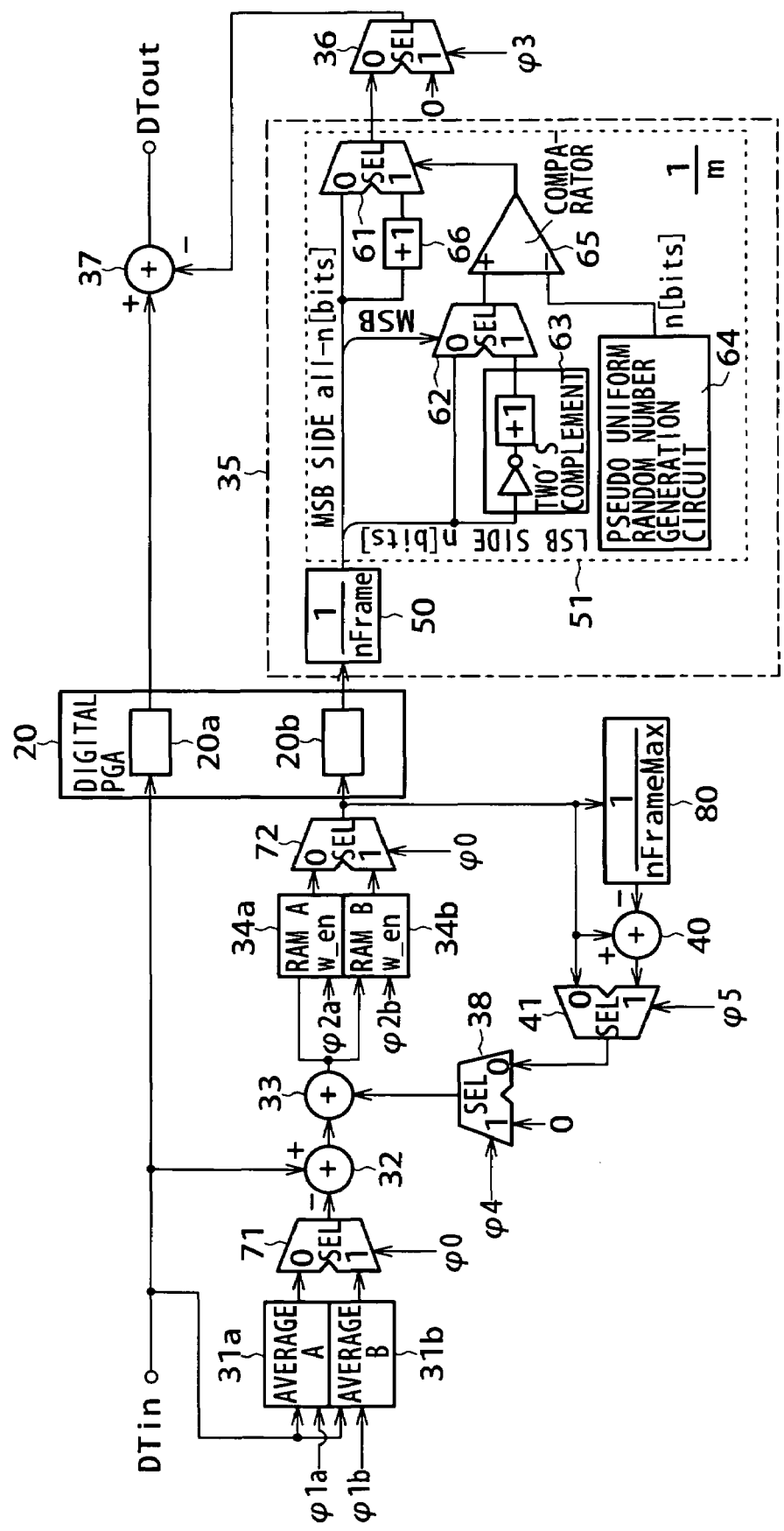
FIG. 13 is a block diagram of a digital PGA/vertical stripe cancellation circuit of a solid-image pickup apparatus according to a sixth embodiment of the present invention.

The digital PGA/vertical stripe cancel circuit 7 of the solid-state image pickup apparatus according to the sixth embodiment is shown in FIG. 13. According to the sixth embodiment, the digital PGA/vertical stripe cancel circuit 7 has all of the features of those in the first to fifth embodiments described above.

The pickup image signal DTin inputted to the digital PGA/vertical stripe cancel circuit 7 is digital gain processed by the gain processing section 20a in the digital PGA 20 and supplied to the subtractor 37.

The pickup image signal DTin is further supplied to the average arithmetic operation circuits 31a and 31b. The average arithmetic operation circuits 31a and 31b calculate reference signal averages in accordance with settings of the gains Ga and Gb as described hereinabove in connection with the fifth embodiment.

Differences between the reference signal averages and the pickup image signal DTin are determined by the subtractor 32 and supplied to the adder 33. The adder 33 adds the difference values to the values fed back from the RAMs 34a and 34b. Then, cumulative sum values by the addition are stored into the RAMs 34a and 34b. The selectors 71 and 72 are switched in response to the settings of the gains Ga and Gb, respectively.

The sum values of the RAMs 34 (34a and 34b) are not reset in a unit of a frame but are cumulatively added successively over a plurality of frames as described hereinabove in connection with the second embodiment. Then, in the ninth and succeeding frames after the addition, for example, by 128 times is completed, sum values corresponding to one frame are subtracted from the sum values of the RAM 34 by the subtractor 40 and fed back to the adder 33 so that the sum values by addition by 128 times may be maintained.

To this end, the values read out from the RAMs 34a and 34b and selected by the selector 72 are supplied to the subtractor 40 and a 1/nFrameMax divider 80. nFrameMax is a maximum value of the frame number nFrame and, for example, according to the value indicated in the example of the second embodiment, is "8". In short, the 1/nFrameMax divider 80 is provided in order to divide the sum values by addition by 128 times by 8 to obtain sum values (16-time added values) corresponding to one frame. The sum values corresponding to one frame are subtracted from the sum values of the RAM 34 by the subtractor 40 and fed back to the adder 33 through the selectors 41 and 38 to perform the operation described hereinabove in connection with the second embodiment.

Further, the sum values stored in the RAMs 34a and 34b are inputted to the divider 35 after a digital gain process is performed by the gain processing section 20b of the digital PGA 20. This corresponds to the configuration described hereinabove in connection with the third embodiment.

In the divider 35, the sum values are first divided by the 1/nFrame divider 50 to determine sum values corresponding to one frame as described hereinabove in connection with the second embodiment.

It is to be noted that the reason why the 1/nFrameMax divider 80 is provided separately from the 1/nFrame divider 50 in the feedback system for sum values described above is that the digital PGA 20 is disposed at the preceding stage to the divider 35. In other words, the reason is that the values to be fed back to the adder 33 are not appropriate unless they are based on the values before a digital gain process is applied.

The 1/m divider 51 in the divider 35 has a configuration for adding random, very small noise described hereinabove in connection with the fourth embodiment with reference to FIG. 9.

An output of the divider 35 is supplied through the selector 36 to the subtractor 37, by which vertical stripe noise correction is performed.

It is to be noted that detailed description of operation of the individual components of the digital PGA/vertical stripe cancel circuit 7 in the sixth embodiment shown in FIG. 13 are omitted herein since it can be recognized from the foregoing description of the first to fifth embodiments.

With the digital PGA/vertical stripe cancel circuit 7 of the solid-state image pickup apparatus according to the sixth embodiment, the following advantages can be anticipated.

Since the digital PGA/vertical stripe cancel circuit 7 is configured so as to determine reference signal averages and cumulatively add difference values between the reference signal averages and pickup image signals similarly as in the first embodiment, efficient use of the RAM 34 can be anticipated.

Since the digital PGA/vertical stripe cancel circuit 7 successively adds such difference values as described above over a plurality of frames similarly as in the second embodiment, the accuracy in the addition and hence the accuracy in detection of vertical stripe noise components can be improved without increasing the number of times of addition within one frame period.

Since the digital PGA/vertical stripe cancel circuit 7 includes the digital PGA 20 disposed intermediately similarly as in the third embodiment, it is advantageous in that the necessity for retention of the accuracy in averages and re-performance of correction upon change of a digital gain is eliminated and the correction limit accuracy by a digital processing error is not deteriorated by the digital gain.

Since the divider 35 in the digital PGA/vertical stripe cancel circuit 7 adds random noise similarly as in the fourth embodiment, the apparent correction accuracy can be improved to improve the picture quality.

The digital PGA/vertical stripe cancel circuit 7 can perform processes corresponding to a plurality of gain patterns similarly as in the fifth embodiment.

While several embodiments of the present invention have been described, the present invention can be carried out in further various forms. While the sixth embodiment is given as a combination of the first to fifth embodiments, various other combinations of the first to fifth embodiments are available.

What is claimed is:

1. A solid-state image pickup apparatus, comprising:
   a pixel sensor section formed as an array of solid-state image pickup elements for generating signals corresponding to incoming light;
   an image signal reading out section which performs parallel reading out of the signals obtained by said pixel sensor section to produce pickup image signals;
   an A/D conversion section for A/D converting the pickup image signals output from said image signal reading out section; and
   a digital processing section which performs a correction process including removing fixed pattern noise from the pickup image signals,
   wherein,
   said digital processing section performs the correction process such that, within a period within which the pickup image signals which are based on a fixed value are input within a one-frame period of the pickup image signals, and a reference signal average is calculated from the pickup image signals based on the fixed value and sum values of difference values of the pickup image signals based on the fixed value from the reference signal average are stored, and then within a period within which the pickup image signals from valid pixels of said pixel sensor section are input within the one-frame period, division averages obtained by dividing the stored sum values are used for the correction, and
   during the correction process, said digital processing section adds random noise to the division averages.

2. A solid-state image pickup apparatus according to claim 1, wherein the sum values to be stored in the correction process of said digital processing section are values obtained by successively adding the difference values over a plurality of frames.

3. A solid-state image pickup apparatus according to claim 2, wherein an upper limit to the number of frames over which the successive addition is to be performed is set, and within every frame period after the upper limit frame number is exceeded, values corresponding to sum values for one frame are subtracted from the stored sum values and the difference values are added to the values obtained by the subtraction and then resulting values are stored as new sum values.

4. A solid-state image pickup apparatus according to claim 1, wherein, in the correction process of said digital processing section, a digital gain process similar to the digital gain process for the pickup image signals is preformed for the sum values, and then the calculation of the division averages is performed for the resulting sum values.

5. A solid-state image pickup apparatus according to claim 1, wherein a gain variation step size of the digital gain process of said digital processing section is set smaller than a gain variation step size of the analog gain process of said image signal reading out section.

6. A solid-state image pickup apparatus according to claim 1, wherein, the image signal reading section performs an analog gain process.

7. A solid-state image pickup apparatus according to claim 6, wherein said digital processing section controls a rate at which the random noise is to be added in response to values of the remainder upon arithmetic operation of the division averages.

8. A solid-state image pickup apparatus according to claim 7, wherein the control of the rate is effected via a process of adding the random noise in response to results of comparison between the values of the remainder and random numbers.

9. A solid-state image pickup apparatus according to claim 1, wherein, in the correction process of said digital processing section, said digital processing section performs, for each of gain setting values set for the pixels which form one screen, the calculation of the reference signal average, the storage of the sum values and the correction using the division averages of the sum values.

10. An image pickup method, comprising:
an image signal reading out step of performing parallel reading out of signals obtained by a pixel sensor section, which is formed from an array of solid-state image pickup elements for generating signals corresponding to incoming light, to produce pickup image signals and performing an analog gain process for the pickup image signals;
an A/D conversion step of A/D converting the pickup image signals output during the image signal reading out step;
a digital gain processing step of performing a digital gain process for the pickup image signals obtained at the A/D conversion section;
a reference signal average calculation step of calculating, within a period within which the pickupimage signals which are based on a fixed value are inputted within a one-frame period of the pickup image signals, a reference signal average from the pickup image signals based on the fixed value;
a sum value storage step of storing sum values of difference values of the pickup image signals based on the fixed value from the reference signal average; and
a correction step of performing, within a period within which the pickup image signals from valid pixels of said pixel sensor section are input within the one-frame period, a correction process of removing fixed pattern noise from the pickup image signals using division averages obtained by dividing the stored sum values with random noise being added to the division averages.

11. An image pickup method according to claim 10, wherein, at the sum value storage step, sum values obtained by successively adding the difference values over a plurality of frames are stored.

12. An image pickup method according to claim 11, wherein an upper limit to the number of frames over which the successive addition is to be performed is set, and within every frame period after the upper limit frame number is exceeded, values corresponding to sum values for one frame are subtracted from the stored sum values and the difference values are added to the values obtained by the subtraction and then resulting values are stored as new sum values.

13. An image pickup method according to claim 10, wherein, at the correction step, a digital gain process similar to the digital gain process for the pickup image signals at the digital gain processing step is preformed for the sum values stored at the sum value storage step, and then the calculation of the division averages is performed for the resulting sum values.

14. An image pickup method according to claim 10, wherein the processes at the reference signal average calculation step, sum value storage step and correction step are performed for each of a plurality of gain setting values set for the pixels which form one screen.

15. A solid-state image pickup apparatus, comprising:
an image pickup area having a plurality of pixels disposed thereon; and
a circuit area for processing image signals from said image pickup area said circuit area including (a) a subtraction section for subtracting a predetermined amount of signal components from the image signals and (b) a pattern noise detection section for detecting pattern noise from signals obtained by the subtraction by said subtraction section,
wherein
said subtraction circuit introduces random signal noise into said signal components.

16. A solid-state image pickup apparatus according to claim 15, wherein said pattern noise detection section includes an area for calculating averages of the signals obtained by the subtraction for a plurality of frames.

* * * * *